United States Patent [19]

Yasohara et al.

[11] Patent Number: 4,900,993
[45] Date of Patent: Feb. 13, 1990

[54] DRIVING APPARATUS FOR BRUSHLESS MOTOR

[75] Inventors: Masahiro Yasohara, Amagasaki; Yoshitsugu Kimura, Sabae; Hiromitsu Nakano, Hirakata, all of Japan

[73] Assignee: Matsushita Electric Industrial Co., Ltd., Kadoma, Japan

[21] Appl. No.: 207,527

[22] Filed: Jun. 16, 1988

[30] Foreign Application Priority Data

Jun. 17, 1987 [JP] Japan ................. 62-150637

[51] Int. Cl.⁴ .............................................. H02P 6/02
[52] U.S. Cl. ..................................... 318/254; 318/138
[58] Field of Search ..................... 318/138, 254, 439

[56] References Cited

U.S. PATENT DOCUMENTS

| | | | |
|---|---|---|---|
| 4,233,548 | 11/1980 | Kirtley | 318/138 |
| 4,250,435 | 2/1981 | Alley et al. | 318/138 |
| 4,295,085 | 10/1981 | Lafuse | 318/138 X |
| 4,595,865 | 6/1986 | Jahns | 318/254 |
| 4,603,283 | 7/1986 | Oltendorf | 318/254 |
| 4,673,849 | 6/1987 | Sears et al. | 318/138 X |
| 4,712,050 | 12/1987 | Nagasawa et al. | 318/254 |

FOREIGN PATENT DOCUMENTS

| | | |
|---|---|---|
| 3306642 | 9/1984 | Fed. Rep. of Germany . |
| 52-80415 | 7/1977 | Japan . |
| 59-36519 | 9/1984 | Japan . |
| 61-3193 | 1/1986 | Japan . |
| 61-22787 | 1/1986 | Japan . |
| 61-135383 | 6/1986 | Japan ................. 318/254 |
| 61-293191 | 12/1986 | Japan . |

Primary Examiner—Bentsu Ro
Attorney, Agent, or Firm—Cushman, Darby & Cushman

[57] ABSTRACT

A phase difference between a counter-electromotive voltage induced in a driving coil and a voltage which is applied to the driving coil is detected by comparison of a terminal voltage of the driving coil and a reference voltage. A frequency of a voltage-control oscillator which controls switching of the voltage applied to the driving coil is varied by an output signal made by the comparison, and the phase difference is controlled to be reduced to zero.

12 Claims, 19 Drawing Sheets

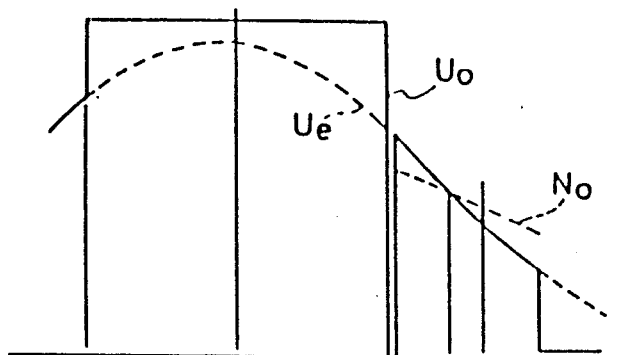
FIG.4(a)
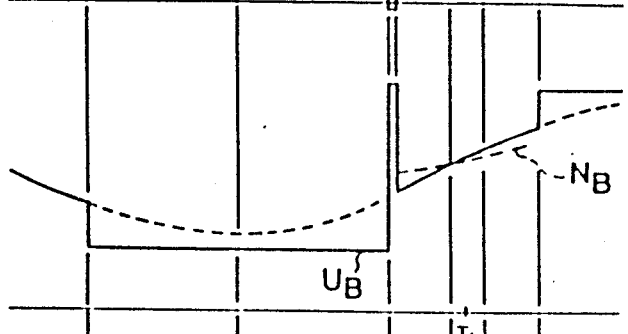
FIG.4(b)
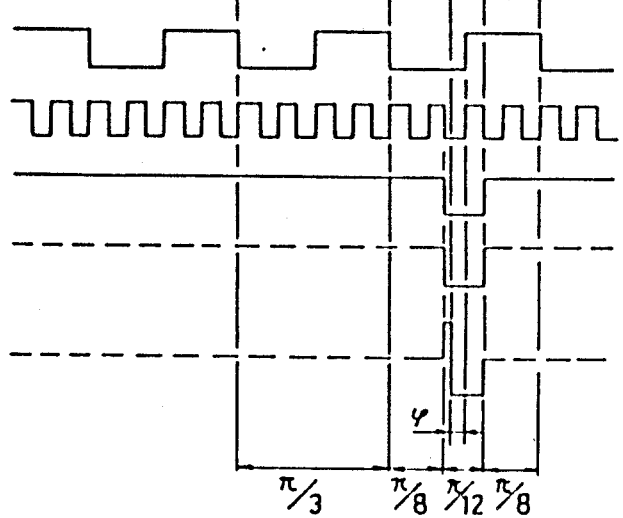
FIG.4(c) $U_1(\bar{U}_H)$
FIG.4(d) $U_2(U_L)$
FIG.4(e) $D_1$
FIG.4(f) $D_2$
FIG.4(g) $S_2$
FIG.4(h) $S_0$
FIG.4(i) $PD$

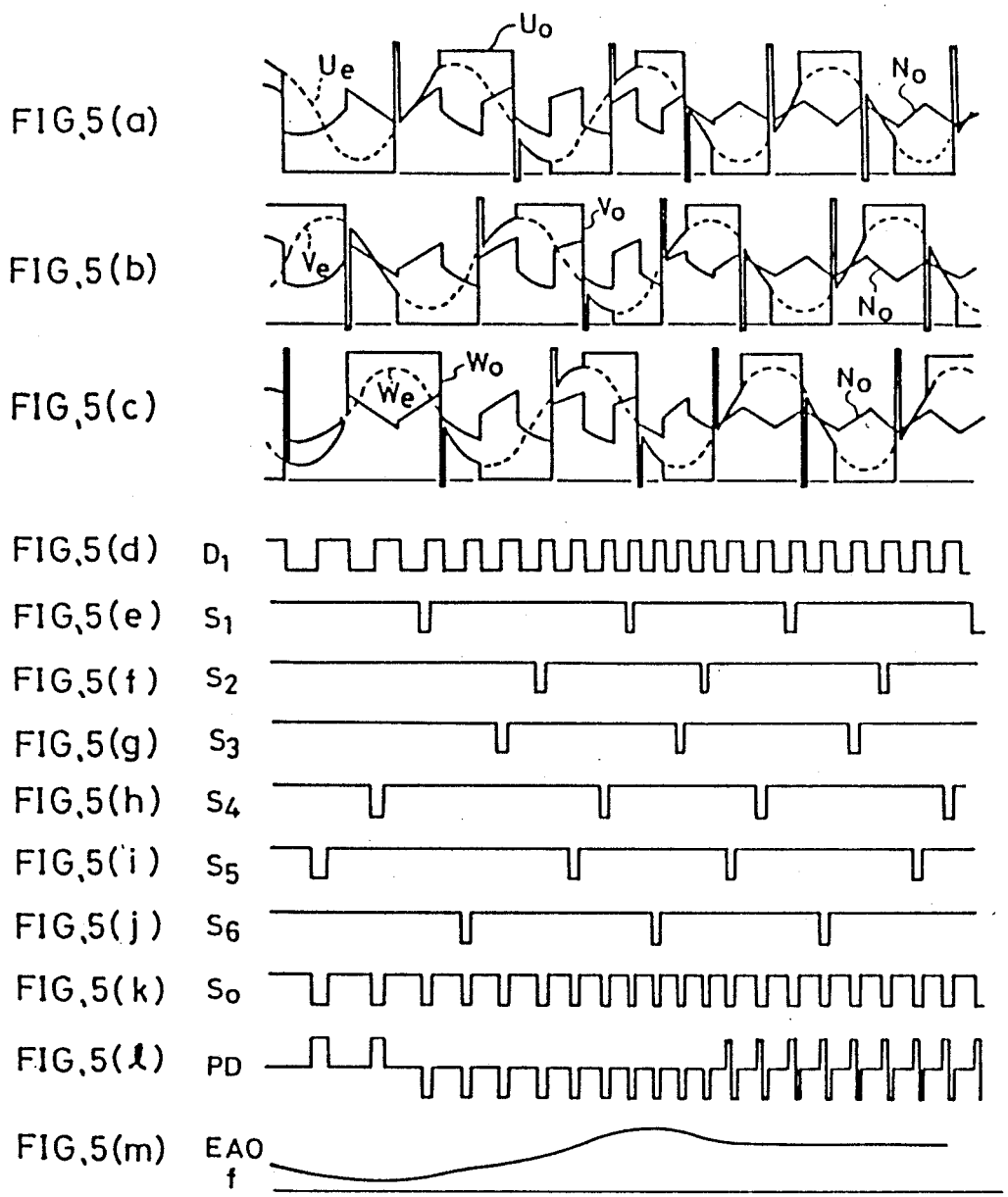

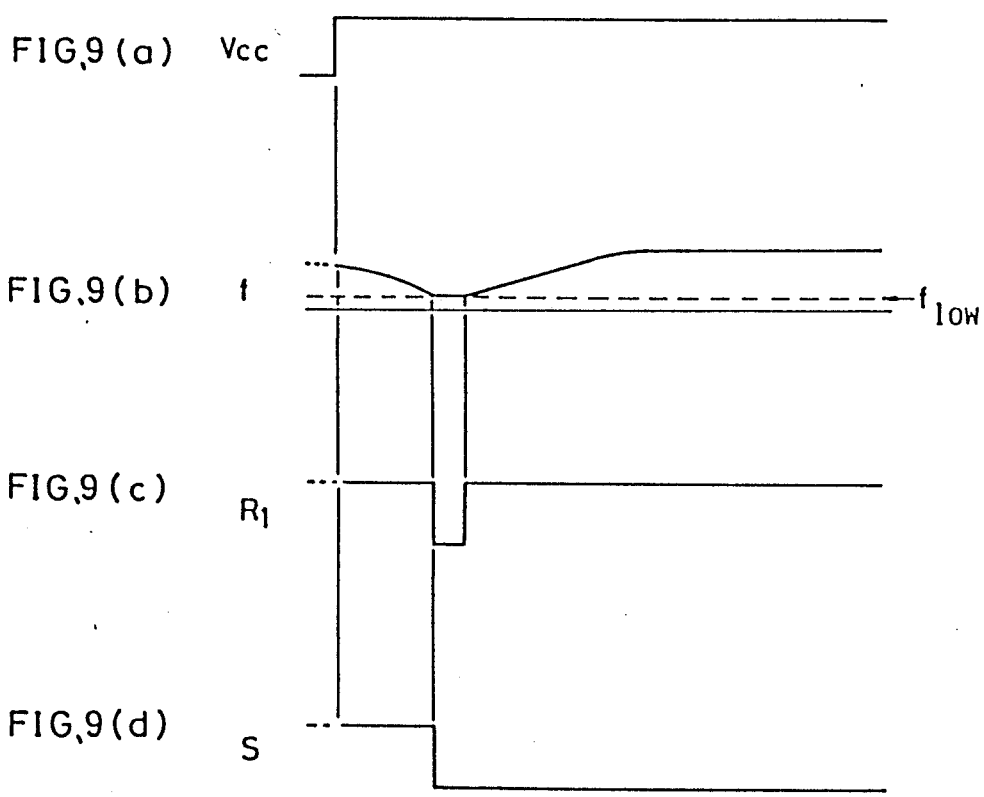

FIG. 10(b)

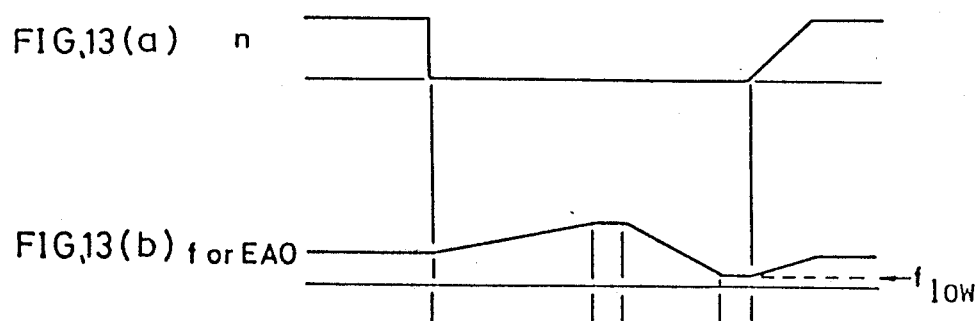
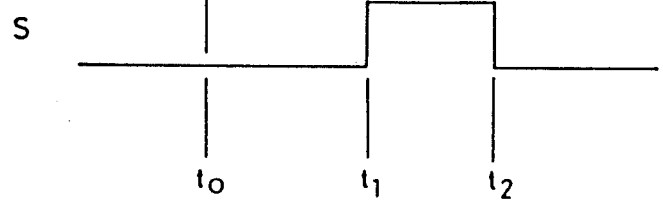

FIG.15(a) U$_o$ (Prior Art) 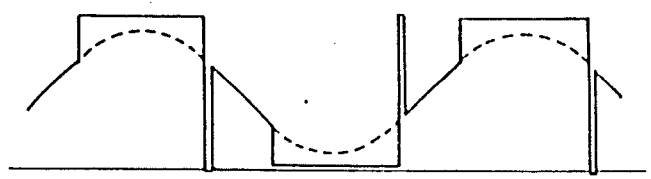
FIG.15(b) V$_o$ (Prior Art) 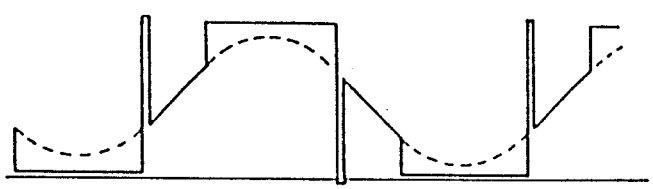
FIG.15(c) W$_o$ (Prior Art) 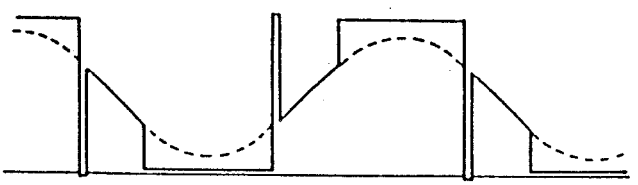
FIG.15(d) F$_1$ (Prior Art) 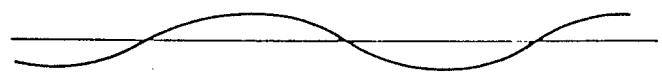
FIG.15(e) F$_2$ (Prior Art) 
FIG.15(f) F$_3$ (Prior Art) 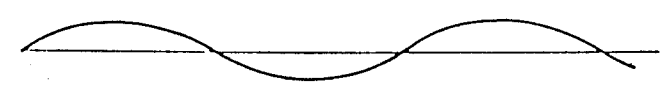
FIG.15(g) U$_H$ (Prior Art) 
FIG.15(h) U$_L$ (Prior Art) 
FIG.15(i) V$_H$ (Prior Art) 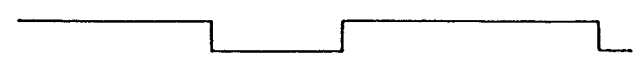
FIG.15(j) V$_L$ (Prior Art) 
FIG.15(k) W$_H$ (Prior Art) 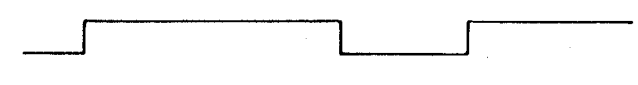
FIG.15(ℓ) W$_L$ (Prior Art) 

FIG.17 (A) (Prior Art) 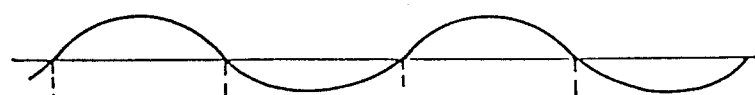
FIG.17 (B) (Prior Art) 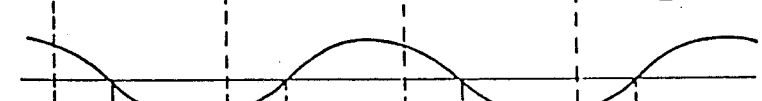
FIG.17 (C) (Prior Art) 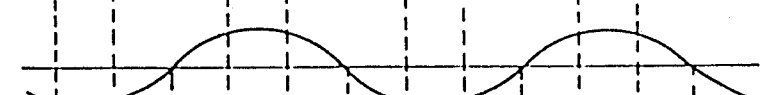
FIG.17 (D) (Prior Art) 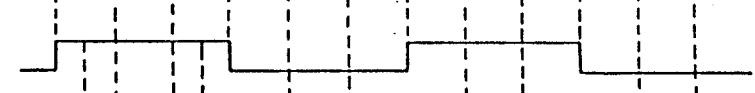
FIG.17 (E) (Prior Art) 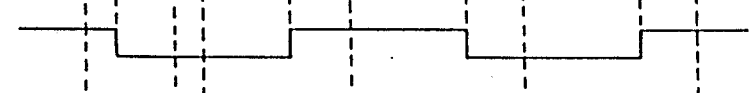
FIG.17 (F) (Prior Art) 
FIG.17 (G) (Prior Art) 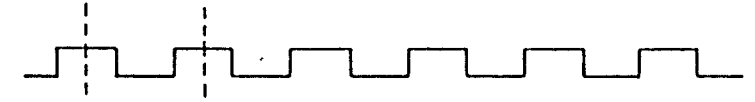
FIG.17 (H) (Prior Art) 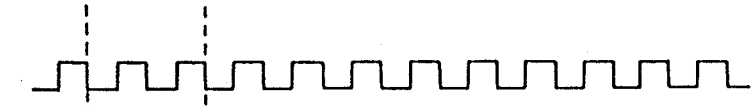
FIG.17 (I) (Prior Art) 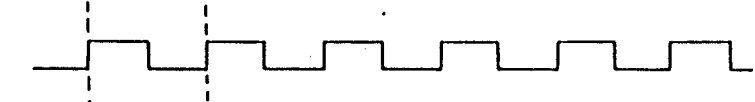
FIG.17 (J) (Prior Art) 
FIG.17 (K) (Prior Art) 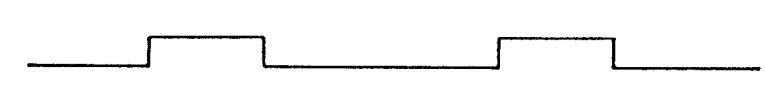
FIG.17 (L) (Prior Art) 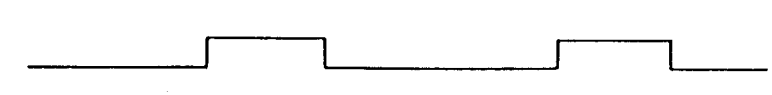
FIG.17 (M) (Prior Art) 
FIG.17 (N) (Prior Art) 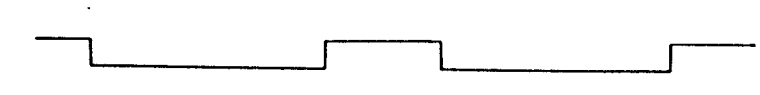
FIG.17 (O) (Prior Art) 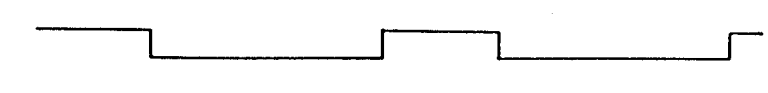

DRIVING APPARATUS FOR BRUSHLESS MOTOR

FIELD OF THE INVENTION AND RELATED ART STATEMENT

1. Field of the Invention

The present invention relates generally to a driving apparatus for a brushless motor, and more particularly to a driving apparatus for a brushless motor for compensating a phase difference between a supply voltage and counter-electromotive voltage without use of a position sensor of a rotor.

2. Description of the Related Art

Generally, a conventional brushless motor has a position sensor for sensing a position of a rotor. The position sensor utilizes a light sensing device or a magnetic sensing device. And plural switching devices for switching driving currents of plural driving coils of the brushless motor are controlled on the basic of an output signal of the position sensor. In order to reduce a cost of the brushless motor and to miniaturize the brushless motor in size, it is desirable to realize a brushless motor which does not require such a position sensor.

A driving apparatus for the brushless motor in the prior art is shown, for example, in the Japanese published unexamined patent application Sho 52-80415. FIG. 14 is a circuitry of the driving apparatus in the prior art. Referring to FIG. 14, each one terminal of driving coils 1, 2 and 3 of the brushless motor is together coupled. The other terminal of the driving coil 1 is coupled to the junction between the anode of a diode 4 and the cathode of a diode 5, and is also coupled to the junction between the respective collectors of the transistors 10 and 13. The other terminal of the driving coil 2 is coupled to the junction between the anode of a diode 6 and the cathode of a diode 7, and is also coupled to the respective collectors of transistors 11 and 14. The other terminal of the driving coil 3 is coupled to the junction between the anode of a diode 8 and the cathode of a diode 9, and is also coupled to the junction of the respective collectors of transistors 12 and 15. The respective cathodes of the diodes 4, 6 and 8 and the respective emitters of the transistors 10, 11 and 12 are coupled to a positive power source line Vcc. The respective anodes of the diodes 5, 7 and 9 and the respective emitters of the transistors 13, 14 and 15 are grounded. Furthermore, the respective terminals of the driving coils 1, 2 and 3 are connected to respective input terminals of a filter circuit 16. Respective output terminals of the filter circuit 16 are connected to respective input terminals of a switching circuit 17. Output of the switching circuit 17 are applied to the respective bases of the transistors 10, 11, 12, 13, 14 and 15.

Operation of the driving apparatus for the brushless motor in this prior art is elucidated hereafter. FIG. 15(a)-FIG. 15(l) are waveform charts showing operation of the driving apparatus. Waveforms as shown in FIG. 15(a), 15(b) and 15(c) are of voltages $U_O$, $V_O$ and $W_O$ of the driving coils 1, 2 and 3, respectively. The voltages $U_O$, $V_O$ and $W_O$ are inputted to the filter circuit 16. Harmonic components of the voltages $U_O$, $V_O$ and $W_O$ are eliminated by the filter circuit 16, and hence, the respective phases of the voltages $U_O$, $V_O$ and $W_O$ become phase-shifted by 90°. The filtered and phase-shifted waveforms of the voltages $U_O$, $V_O$ and $W_O$ are shown by waveforms of output signals $F_1$, $F_2$ and $F_3$ of the filter circuit 16. The filter circuit 16 is a linear filter, and comprises an RC passive filter or a linear Miller integrating circuit, for example. A cut-off frequency of the filter circuit 16 is selected to be far lower than a frequency of the voltages $U_O$, $V_O$ and $W_O$. The output signals $F_1$, $F_2$ and $F_3$ of the filter circuit 16 are inputted to the switching circuit 17. The switching circuit 17 comprises a logic circuit and generates control signals $U_H$, $U_L$, $V_H$, $V_L$, $W_H$ and $W_L$ by logical operation of the output signals $F_1$, $F_2$ and $F_3$. The control signals $U_H$, $U_L$, $V_H$, $V_L$, $W_H$ and $W_L$ are applied to the bases of the transistors 10, 11, 12, 13, 14 and 15. The transistors 10, 12, 13, 14 and 15 are switched by the control signals $U_H$, $V_H$, $W_H$, $U_L$, $V_L$ and $W_L$, respectively, so that the torque of the rotor of the brushless motor is produced in a selected direction.

In the brushless motor of the prior art, it is necessary that a filter circuit having a low cut-off frequency which is far lower than the frequency of the voltages $U_O$, $V_O$, $W_O$ be provided for each driving coil of the brushless motor. The filter circuit having the low cut-off frequency comprises capacitors having large capacitance, and many large capacitors must be mounted in the driving apparatus.

Furthermore, in the driving coil having a large inductance, a phase of the current flowing the driving coil is phase-shifted from a phase of the output of the transistors. Consequently, counteraction of the rotor arises, and thereby a magnetic field of permanent magnets of the rotor is eliminated by the magnetic field produced by the driving coil itself. In the above-mentioned case, when the voltages $U_O$, $V_O$ and $W_O$ of phases relation as shown in FIG. 15(a), 15(b) and 15(c), respectively are supplied to the driving coils 1, 2 and 3, respectively, it is known that the efficiency of the brushless motor is lowered.

A method is disclosed for compensating lag of the current due to the counteraction of the rotor by advancement of the phases of the signals $F_1$, $F_2$ and $F_3$ as shown in FIG. 15(d), FIG. 15(e) and FIG. 15(f), respectively in order to improve the efficiency. This method is disclosed in the Japanese published unexamined patent application Sho 52-80415. In the driving apparatus of the patent application Sho 52-80415, further capacitors and other electronic components are required. Furthermore, spike-shaped noises induced at turns ON are superimposed on the voltages $U_O$, $V_O$ and $W_O$. Finally, the voltages $U_O$, $V_O$ and $W_O$ are varied by variation of the current, whereby the current variation is induced by variation of the power supply voltage and a load. Therefore, it is difficult to obtain the complete signals $F_1$, $F_2$ and $F_3$ by the filter circuit 16.

In order to improve the above-mentioned difficulties, the Japanese patent Sho 59-36519 discloses that three-phase voltages generated in stator windings of the brushless motor are converted to signals of triangular waveform having phase difference of about 90° from that of the three-phase voltages, respectively. The three signals of the triangular waveform are applied to the respective terminals of the resistors which are connected in Y-shape. Then, the above-mentioned signals of the triangular waveform are compared with a voltage of the junction of the Y-shaped connection, and three pulse signals are output. Semiconductor switching devices of three-phase bridge-connection are controlled by the three-pulse signals, and a rotor of a permanent magnet is rotated.

However, the method for producing the switching signals from the voltages of the driving coils by means of the filter circuit has fundamentally the following problems: a spike-shaped noise is induced immediately after turns of state of the semiconductor switching device, and is superimposed on a fundamental signal of the counter-electromotive voltage generated in the driving coils. The level of the spike-shaped noise signal is always varied by variation of a power source voltage or load of the brushless motor. As a result, the switch timing of the current to be supplied to the driving coils deviates from a normal timing.

In order to maintain a precise switch timing, various methods have been developed. One of the methods is to maintain a constant phase difference between the counter-electromotive voltage and the current switching signal by adjustment of the filter circuit. However, maintenance of the constant phase difference is very difficult in the actual operation. Furthermore, many capacitors are required to make the circuit in addition to the capacitors of the filter circuit, and there are difficulties in size-reduction by mounting the capacitors in an integrated circuit due to increase of the external components and number of the connections. Consequently the driving apparatus is expensive.

A current switching method using a digital circuit such as a microcomputer is disclosed in the Japanese published unexamined patent application Sho 61-293191. In this prior art, a time period from a time of current switching to a time wherein the terminal voltage of a driving coil meets to the voltage of the junction of the three driving coils is measured on the basis of a clock signal, and the subsequent current switching is operated at a time which is four times of the time period. A microcomputer is used to measure the above-mentioned time, and thereby the driving apparatus is expensive.

Furthermore, a current switching method using a phase locked loop circuit (PLL) is described in the Japanese patent Sho 61-3193. The circuit block diagram of this prior art is shown in FIG. 16. Counter-electromotive voltages A, B and C as shown in FIG. 17(a), FIG. 17(b) and FIG. 17(c), respectively, are inputted to comparators 24, 25 and 26, respectively. Outputs D, E and F of the comparators 11, 12 and 13 as shown in FIG. 17(d), FIG. 17(e) and FIG. 17(f), respectively, are applied to a logic circuit composed of AND gates 27, 28 and 29 and an OR gate 23. An output signal G of the OR gate 23 is shown in FIG. 17(g). An output of a voltage control oscillator 20 is de-multiplied by a frequency de-multiplier 21, and the output of the frequency de-multiplier 21 is compared with the pulse signal G in a phase detector 18. The output of the phase detector 18 is fed back to the voltage control oscillator 20, and the output of the frequency de-multiplier 21 is synchronized with the output signal G. The output signal of the frequency de-multiplier 21 is further de-multiplied by frequency de-multipliers 22A and 22B and is applied to the semiconductor switching devices 10–15.

In the above-mentioned method, the voltage which is supplied to the driving coil and spike-shaped noise signal which is generated by turns ON or OFF of the switching device are superimposed on the counter-electromotive voltage generated in the driving coil in actual operation. Therefore, it is very difficult to obtain only the output signal G by reform and logical process of the counter-electromotive voltage. In the actual operation, the pulse signal G as shown in FIG. 17(g) cannot be obtained by the circuitry as shown in FIG. 16 by influence of the spike-shaped noise signal. Therefore, the output of the frequency de-multiplier 21 can not be compared with the pulse signal G, and synchronization between both the signals I as shown in FIG. 17(i) and G is difficult.

OBJECT AND SUMMARY OF THE INVENTION

An object of the present invention is to provide an improved driving apparatus for a brushless motor for realizing precise current switching which is free from a spike-shaped noise superimposed on the current flowing in driving coils, free from variation of the power supply voltage, and free from a load variation and reaction of a rotor.

The driving apparatus for brushless motor in accordance with the present invention comprises:

switching terminal means for switching voltages to respective driving coils having a corresponding plurality of phases with respect to the brushless motor, a switching signal generation circuit for controlling the switching means and for generating a switching signal, a phase difference detector for detecting a phase difference between a counter-electromotive voltage induced in one of the driving coils and a the switching signal in a time period that the induced voltage corresponds to the respective terminal voltage, an amplifier for amplifying a detected signal of the phase difference detector and outputting an amplified signal, and a voltage-controlled oscillator for oscillating a signal controlled in frequency by the amplified signal and for supplying the oscillated signal to the switching signal generation circuit.

BRIEF DESCRIPTION OF THE DRAWINGS

FIG. 4(a), FIG. 4(b), FIG. 4(c), FIG. 4(d), FIG. 4(e), FIG. 4(f), FIG. 4(g), FIG. 4(h) and FIG. 4(i) are waveform charts showing operation of the phase difference detector;

FIG. 5(a), FIG. 5(b), FIG. 5(c), FIG. 5(d), FIG. 5(e), FIG. 5(f), FIG. 5(g), FIG. 5(h), FIG. 5(i), FIG. 5(j), FIG. 5(k), FIG. 5(l) and FIG. 5(m) are waveform charts showing detailed operation of the first embodiment;

FIG. 9(a), FIG. 9(b), FIG. 9(c) and FIG. 9(d) are waveform charts showing operation of the third embodiment of the driving apparatus for the brushless motor;

FIG. 10(a) and FIG. 10(b) are a detailed circuitry of the third embodiment as shown in FIG. 8;

FIG. 13(a), FIG. 13(b), FIG. 13(c), FIG. 13(d) and FIG. 13(e) are waveform charts showing operation of the fourth embodiment as shown in FIG. 11 and FIG. 12;

FIG. 15(a), FIG. 15(b), FIG. 15(c), FIG. 15(d), FIG. 15(e), FIG. 15(f), FIG. 15(g), FIG. 15(h), FIG. 15(i), FIG. 15(j), FIG. 15(k) and FIG. 15(l) are waveform charts showing operation of the driving apparatus of the brushless motor in the prior art;

FIG. 17(a), FIG. 17(b), FIG. 17(c), FIG. 17(d), FIG. 17(e), FIG. 17(f), FIG. 17(g), FIG. 17(h), FIG. 17(i), FIG. 17(j), FIG. 17(k), FIG. 17(l), FIG. 17(m), FIG. 17(n) and FIG. 17(o) are the waveform charts showing operation of the driving apparatus of the brushless motor as shown in FIG. 16.

DESCRIPTION OF THE PREFERRED EMBODIMENT

Figure 1:
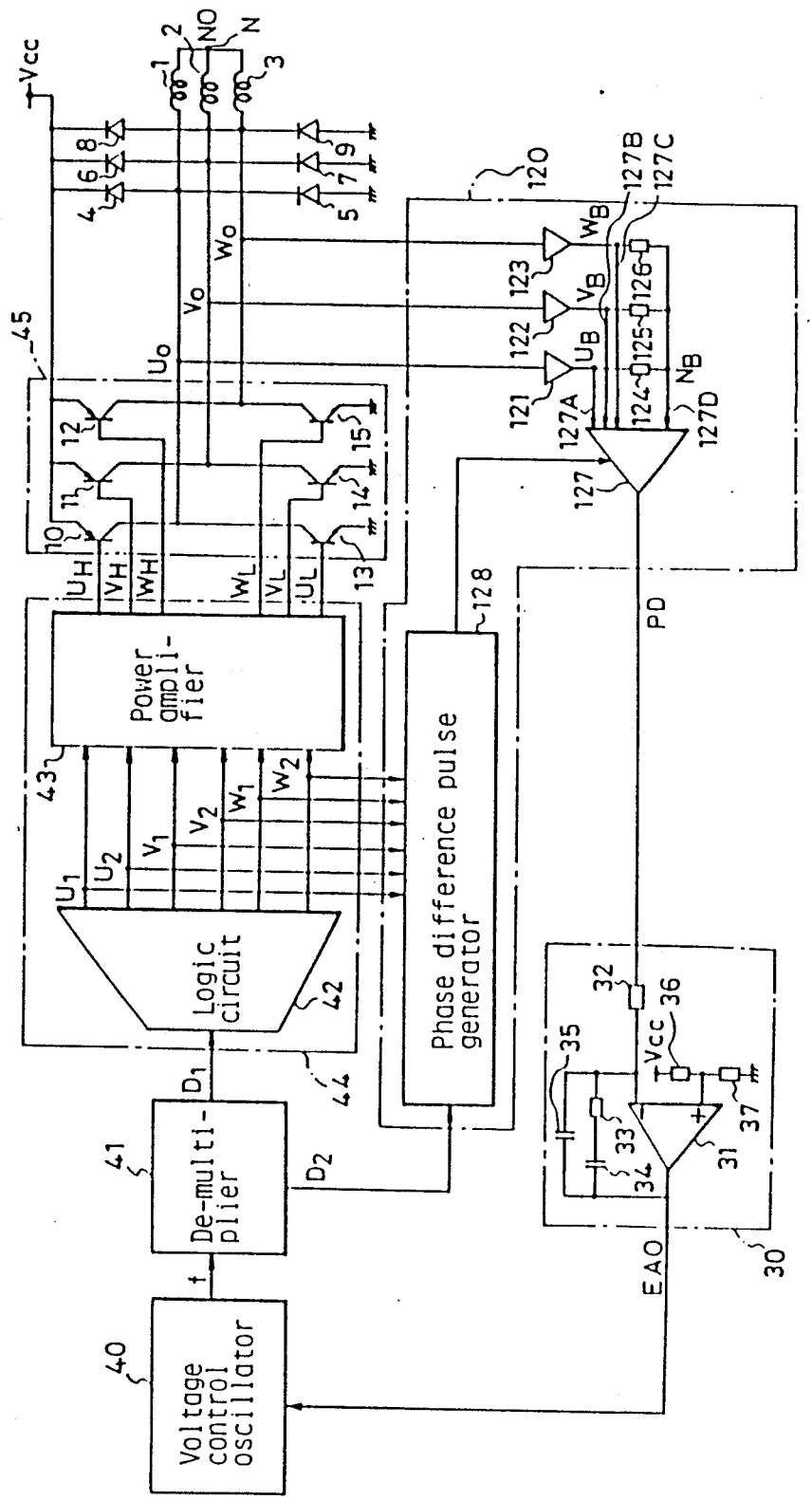
FIG. 1 is a circuitry of a first embodiment of a driving apparatus for a brushless motor in accordance with the present invention.
Figure 14:
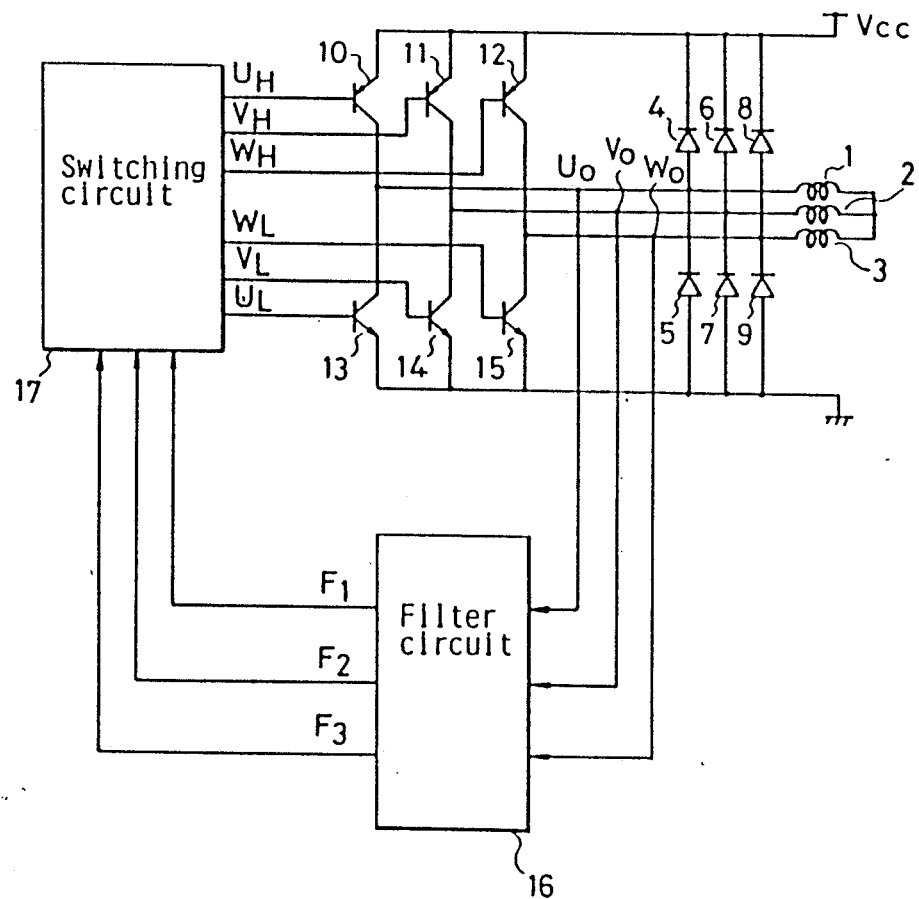
FIG. 14 is the circuitry of the driving apparatus of the brushless motor in the prior art.
Figure 16:
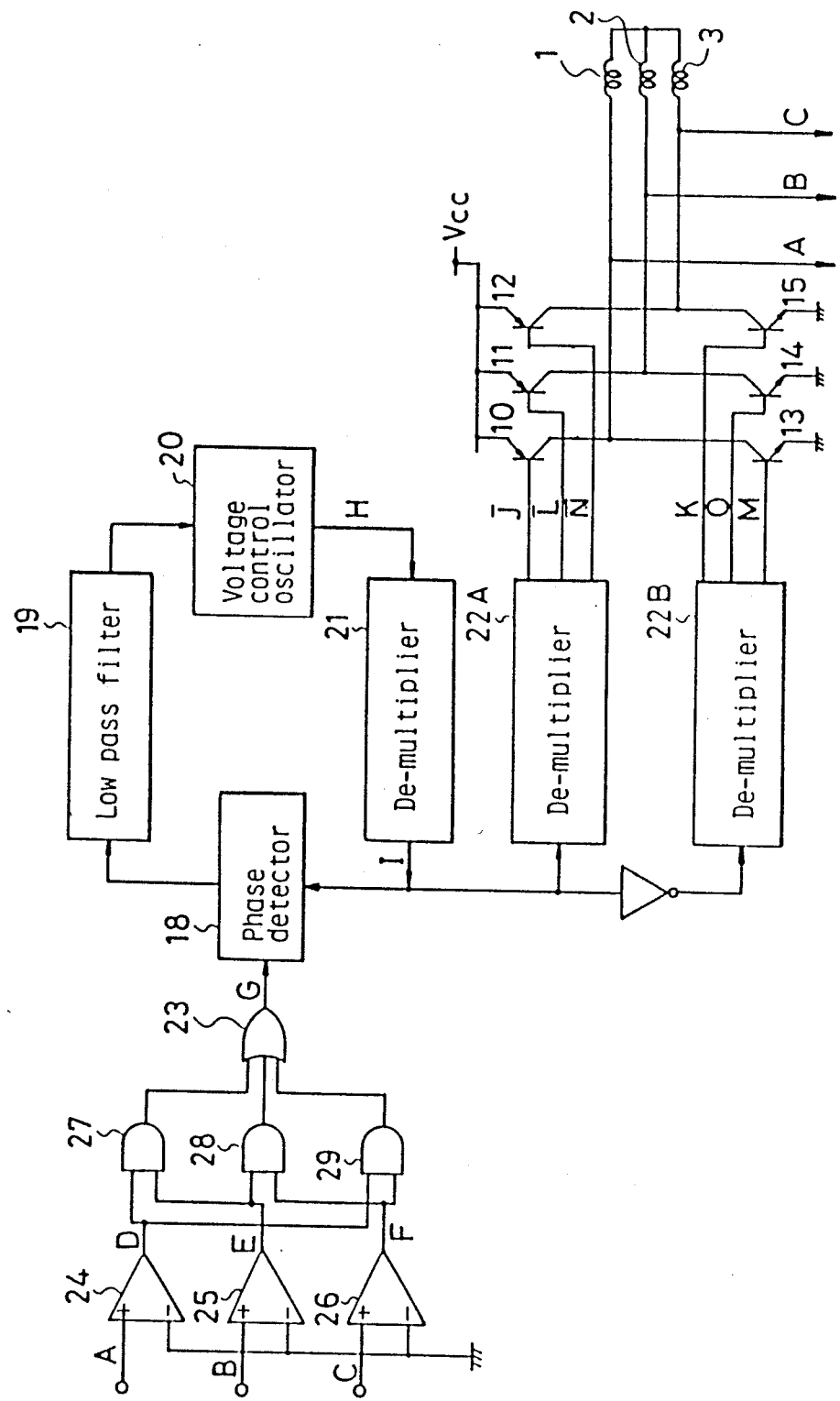
FIG. 16 is the block diagram of the driving apparatus of the brushless motor in other prior art.

FIG. 1 is a circuitry of a first embodiment of a driving apparatus for a brushless motor in accordance with the present invention. Referring to FIG. 1, elements similar to the elements of FIG. 14 are identified by like numerals. Each one terminal of driving coils 1, 2 and 3 is together coupled at a junction N. The other terminal of the driving coil 1 is coupled to the junction between the anode of a diode 4 and the cathode of a diode 5, and is also coupled to the junction between the respective collectors of the transistors 10 and 13. The other terminal of the driving coil 2 is coupled to the junction between the anode of a diode 6 and the cathode of a diode 7, and is also coupled to the respective collectors of transistors 11 and 14. The other terminal of the driving coil 3 is coupled to the junction between the anode of a diode 8 and the cathode of a diode 9, and is also coupled to the junction of the respective collectors of transistors 12 and 15. The respective cathodes of the diodes 4, 6 and 8 and the respective emitters of the transistors 10, 11 and 12 are coupled to a positive power source line Vcc. The respective anodes of the diodes 5, 7 and 8 and the respective emitters of the transistors 13, 14 and 15 are grounded. The respective terminals of the driving coils 1, 2 and 3 are connected to input terminals 127A, 127B and 127C of the comparator 127 through buffer circuits 121, 122 and 123, respectively.

Resistors 124, 125 and 126 are connected across the input terminals 127A, 127B and 127C and an input terminal 127D of the comparator 127, respectively. The output of the comparator 127 is connected to an invert input of an operational amplifier 31 of an amplifier 30 through a resistor 32. A reference voltage which is decided by resistors 36 and 37 is applied to a noninvert terminal of the operational amplifier 31.

A feedback capacitor 34 and a resistor 33 which are coupled in series and a feedback capacitor 35 are connected across the invert input and an output terminal of the operational amplifier 31. The output of the amplifier 30 is inputted to a voltage control oscillator 40. A frequency of the voltage control oscillator 40 is controlled by a voltage applied by the amplifier 30. The output of the voltage control oscillator 40 is inputted to a frequency de-multiplier 41. An output $D_1$ of the frequency de-multiplier 41 is inputted to a logic circuit 42 of a switching signal generation circuit 44. The other output $D_2$ of the frequency de-multiplier 41 is inputted to a phase difference pulse generator 128.

Six outputs $U_1$, $U_2$, $V_1$, $V_2$, $W_1$, $W_2$ of the logic circuit 42 are inputted to a power amplifier 43, and are also inputted to the phase difference pulse generator 128. An output of the phase difference pulse generator 128 is applied to the comparator 127.

A phase difference detector 120 is composed of the phase difference pulse generator 128 and the comparator 127. Outputs $U_H$, $U_L$, $V_H$, $V_L$, $W_H$, $W_L$ of the power amplifier 43 are applied to the respective bases of the transistors 10–15.

Operation of the first embodiment is elucidated hereafter.

Figure 2:
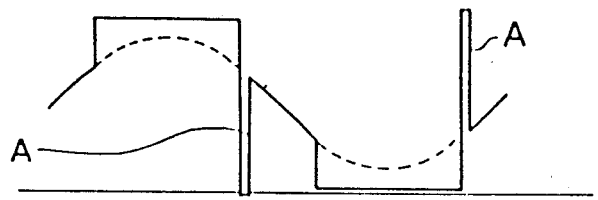
FIG. 2(a), FIG. 2(b) and FIG. 2(c) are waveform charts showing operation of the first embodiment.
Figure 2:
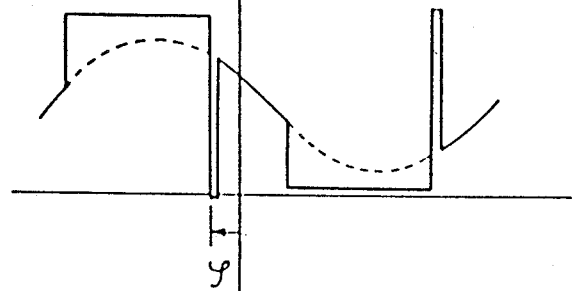
Figure 2:
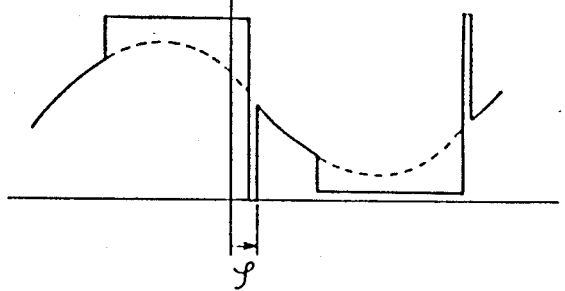

Waveforms of voltages across both the terminals of one of three driving coils 1, 2 and 3 in operation are shown in FIG. 2(a), FIG. 2(b) and FIG. 2(c). Referring to FIG. 2(a), FIG. 2(b) and FIG. 2(c), a sinusoidal counter-electromotive voltage as shown by both dotted lines and solid lines is superimposed with a square wave supply voltage from the switching circuit 45, and a composite waveform is shown by a solid line.

Spike-shaped signals A are generated by inductance of the driving coil at turn-OFF of the transistors of the switching circuit 45. The most suitable state of the phase difference between the sinusoidal counter-electromotive voltage and the supply voltage is shown in FIG. 2(a). On the other hand, in the composite waveform as shown in FIG. 2(b), the phase of the supply voltage is phase-shifted from the phase of the sinusoidal counter-electromotive voltage by $\phi$ degrees. On the contrary, the phase of the supply voltage advances to the sinusoidal counter-electromotive voltage by $\phi$ degrees in the waveform as shown in FIG. 2(c).

Referring to FIG. 1, since the switching circuit 45 is driven on the basis of the output signal of the voltage control oscillator 40, each phase of the voltages which are applied to the driving coil 1, 2 and 3 maintains a predetermined phase difference with the output signal of the voltage control oscillator 40. Therefore, phase difference between the counter-electromotive voltage and the voltage which is supplied to the driving coil 1, 2 or 3 is variable by control of the frequency and phase of the voltage control oscillator 40.

In the first embodiment, the phase difference $\phi$, as shown in FIG. 2(b) or FIG. 2(c) is detected by the phase difference detector 120 as a phase difference signal PD. The phase difference signal PD of the phase difference detector 120 is amplified by the amplifier 30, and is applied to the voltage control oscillator 40. The oscillating frequency of the voltage control oscillator 40 is varied by variation of an output EAO of the amplifier 30 so that the phase difference $\phi$ is converged to zero. Namely, a phase control loop is formed by the phase difference detector 120 and the voltage control oscillator 40. As a result, as shown in FIG. 2(a), the most suitable state of the phase relation between the counter-electromotive voltage and the voltage which is applied to the driving coil 1, 2 or 3 is maintained, and stable revolution is realized, thereby improving efficiency of the brushless motor.

Figure 3:
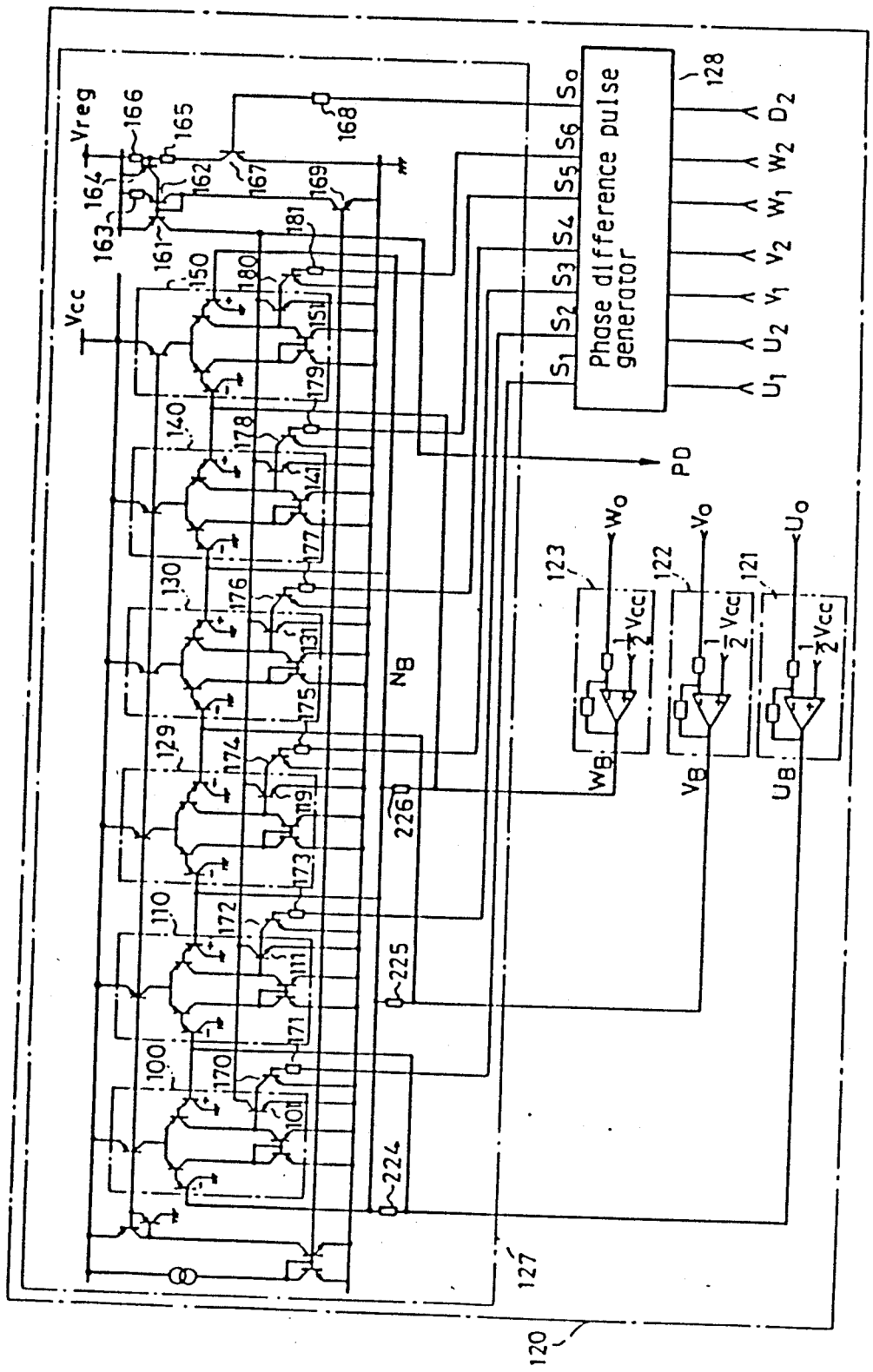
FIG. 3 is a circuitry of a phase difference detector.

An actual circuit of the phase difference detector 120 is shown in FIG. 3. Referring to FIG. 3, terminal voltages $U_o$, $V_o$ and $W_o$ of the respective driving coils 1, 2 and 3 are inputted to respective buffer circuits 121, 122 and 123. The output terminals of the respective buffer circuit 121, 122 and 123 are joined together through the respective resistors 224, 225 and 226, and the junction NB is coupled to the invert input terminals of comparators 100, 129 and 140, and is also coupled to respective noninvert input terminals of the comparators 110, 130 and 150.

Furthermore, the output $U_B$ of the buffer circuit 121 is applied to the noninvert input of the comparator 100 and the invert input of the comparator 110. The output $V_B$ of the buffer circuit 122 is applied to the noninvert input of the comparator 129, and is applied to the invert input of the comparator 130. The output $W_B$ of the buffer circuit 123 is applied to the noninvert input of the comparator 140 and the invert input of the comparator 150. The respective outputs of the comparators 100, 110, 129, 130, 140 and 150 are output as open collector of the respective transistors 101, 111, 119, 131, 141 and 151. The respective collectors of the transistors 101, 111, 119, 131, 141 and 151 are joined together, and therefrom the output PD of the phase difference detector 120 is output. The base of the transistor 161 is coupled to the base and the collector of the transistor 162, and is also coupled to the collectors of the transistor 164 and the transistor 169 which serves as a constant current source. A regulated power source voltage Vreg is applied to the emitter of the transistor 161 through a resistor 163. The regulated power source voltage Vreg is also applied to the emitters of the transistors 161 and 164. The base of the transistor 164 is coupled to the emitter thereof through a resistor 166, and is coupled to the collector of the transistor 167 through a resistor 165. The emitter of the transistor 167 is grounded.

An output $S_O$ of the phase difference pulse generator 128 is applied to the base of the transistor 167 through a resistor 168. Other outputs $S_1$, $S_2$, $S_3$, $S_4$, $S_5$ and $S_6$ of the phase difference pulse generator 128 are applied to the respective bases of the emitter-grounded transistors 170, 172, 174, 176, 178 and 180 through the resistors 171, 173, 175, 177, 179 and 181, respectively. The collectors of the transistors 170, 172, 174, 176, 178 and 180 are coupled to the bases of the transistors 101, 111, 119, 131, 141 and 151, respectively. The outputs $U_1$, $U_2$, $V_1$, $V_2$, $W_1$ and $W_2$ of the logic circuit 42 are inputted to the respective inputs of the phase difference pulse generator 128. The output $D_2$ of the frequency de-multiplier 41 is also inputted to the phase difference pulse generator 128.

Operation of the above-mentioned phase difference detector 120 is elucidated hereafter.

FIG. 4(a)–FIG. 4(i) are waveform charts showing operation of the phase difference pulse generator 128 for detecting phase difference between the counter-electromotive voltage and supply voltages with respect to the driving coil 1. The outputs $U_H$, $U_L$ of the power amplifier 43 which are substantially identical with the outputs $U_1$, $U_2$ of the logic circuit 42 are in synchronism with the outputs $D_1$ and $D_2$ of the frequency de-multiplier 41 which de-multiplied the frequency of output of the voltage control oscillator 40. The voltage which is applied to the driving coil 1 is controlled on the basis of the outputs $U_1$, $U_2$. When both the outputs $U_1$, $U_2$ are not issued, both bases of the transistors 10 and 13 remain low level and the driving voltage to the driving coil 1 is not supplied. The time period between a fall edge of the output $U_1$ and a rise edge of the output $U_2$ as shown in FIG. 4(c) and FIG. 4(d) is designated as "a current suspensive period I". In the current suspensive period I, the waveform of the terminal voltage $U_o$ of the driving coil 1 is identical with the waveform of the counter-electromotive voltage $U_e$ as shown in FIG. 4(a). The current suspensive period I is shown by an interval in which both the output $U_1$ and $U_2$ are in low level as shown in FIG. 4(c) and FIG. 4(d), and is equal to one cycle of the output $D_1$ as shown in FIG. 4(e), and is equal to four cycles of the output $D_2$ as shown in FIG. 4(f).

In the levels of the voltage $N_O$ of the junction N of the driving coils 1, 2 and 3 and terminal voltage $U_O$ of the driving coil 1, when the phase difference between the terminal voltage $U_O$ and the counter-electromotive voltage $U_e$ is zero, the voltage $N_O$ becomes equal to the terminal voltage $U_O$ at an intermediate time $T_1$ of the current suspensive period I. The intermediate time $T_1$ is equal to a time of two cycles of the output $D_2$ after a fall edge of the output $U_1$ as shown in FIG. 4(c). On the other hand, when phase of the terminal voltage $U_O$ lags from that of the counter-electromotive voltage $U_e$ by a phase difference $\phi$, the waveform of the voltage $N_O$ equals the voltage of terminal voltage $U_O$ at the part between the fall edge of the output $U_1$ and the intermediate time $T_1$ as shown in FIG. 4(a) and FIG. 4(b). On the contrary, when phase of the voltage $U_O$ advances to that of the counter-electromotive voltage $U_e$ by a phase difference $\phi$, the waveform of the voltage $N_O$ equals the voltage of $U_O$ between the intermediate time $T_1$ and the rise edge of the output $U_2$. Therefore, phase relation between the voltages $U_O$ and $U_e$ is detected by comparison of the voltages $U_O$ and $N_O$ in the current suspensive period I.

In order to detect the phase difference $\phi$, as shown in FIG. 4(g) and FIG. 4(h), outputs $S_2$ and $S_O$ of phase difference detecting pulse signals are generated and have a pulse width substantially equal to a time of one cycle of the output $D_2$ and are positioned at the center of the current suspensive period I; and the voltage $N_O$ is compared with the output $U_O$ during the interval phase difference detecting pulse signals $S_2$ and $S_O$ are generated. Consequently, a phase difference signal PD having a duty ratio corresponding to the phase difference $\phi$ is issued from the phase difference detector 120. Referring to FIG. 4(i), the voltage $U_O$ is later than the voltage $U_e$ by the phase difference $\phi$.

The above-mentioned operation is accomplished during the current suspensive period I between the fall edge of the output $U_2$ and the rise edge of the output $U_1$. And in a similar manner, the operation is accomplished with respect to voltages $V_O$ and $W_O$ of the respective driving coils 2 and 3. The phase difference signal PD of the phase difference detector 120 is a composite signal of the plural comparators.

The buffer circuits 121, 122 and 123 serve as inverting amplifiers having a gain of ½, and voltages of the outputs $U_B$, $V_B$ and $W_B$ of the respective buffer circuit 121, 122 and 123 are made to be in the range of input voltages of the respective comparators 100, 110, 129, 130, 140 and 150.

Output voltages of the respective circuits in operation of the phase difference detector 120 as shown in FIG. 3 are shown in FIG. 5(a)–FIG. 5(m). Referring to FIG. 5(l), the phase difference signal PD of the phase difference detector 120 is formed on the basis of the respective terminal voltages $U_O$, $V_O$ and $W_O$, and the output EAO for controlling the voltage control oscillator 40 is generated by the amplifier 30. The frequency of the voltage control oscillator 40 is varied by the output EAO. As a result, the output of the frequency de-multiplier 41 is phase-sifted, and thereby the phase difference φ is made of be zero. Variation of the output EAO is shown in FIG. 5(m).

Referring to FIG. 5(m), in initial stage, the output EAO is of comparatively low level as shown in a left portion of the waveform, and the revolution velocity of the brushless motor is low. The phase of the terminal voltage $U_O$ lags from that of the counter-electromotive voltage $U_e$ as shown in FIG. 5(l). Then, the revolution velocity gradually rises by boost of the output EAO, and the phase of terminal voltage $U_O$ leads that of the counter-electromotive voltage $V_e$ as shown in central portion of FIG. 5(l). Finally, the output EAO becomes a constant value, and the phase difference converges on zero in the right portion of the FIG. 5(l) and FIG. 5(m).

As mentioned above, according to the embodiment, the driving coils 1, 2 and 3 of the brushless motor are driven on the basis of the output of the voltage control oscillator 40. Then, the phase difference between the voltages applied to the driving coils 1, 2 and 3 and the counter-electromotive voltages of the driving coils 1, 2 and 3 are detected by the phase difference detector 120, and the frequency of the voltage control oscillator 40 is controlled so that the phase difference is converged on zero by the amplified signal of the phase difference detector. Therefore, the brushless motor is free from influence of the rotor reaction, and efficiency of the brushless motor is improved.

In the embodiment, the driving apparatus has no filter circuit, accordingly, the present invention dispenses with use of capacitors having large capacitance. Moreover, the phase difference signal PD is generated in the current suspensive period I by comparing voltages applied to the driving coils with a neutral voltage $N_B$ which is a composite voltage of the driving coils 1, 2 and 3. Since the phase difference signal PD is generated out of a period of presence of the spike-shaped signal A, influence by the spike-shaped signal A is avoidable. Moreover, detection of the phase difference is accomplished during the current suspensive period I, and therefore the switch timing of the driving apparatus is not influenced by the voltage drop due to the impedance of the driving coils and a variation of the current flowing the driving coils.

Furthermore, a pulse width of the phase difference signal PD corresponds to "an electric angle" or "a mechanical angles" of the brushless motor. Therefore, the phase difference depends on a duty ratio of the output wherein the counter-electromotive voltage is compared with the neutral voltage $N_B$ in the current suspensive period I, and sensitivity for detecting the phase difference is not influenced by the revolution speed of the brushless motor. As a result, stable operation of the phase control loop is continuously maintained.

Figure 6:
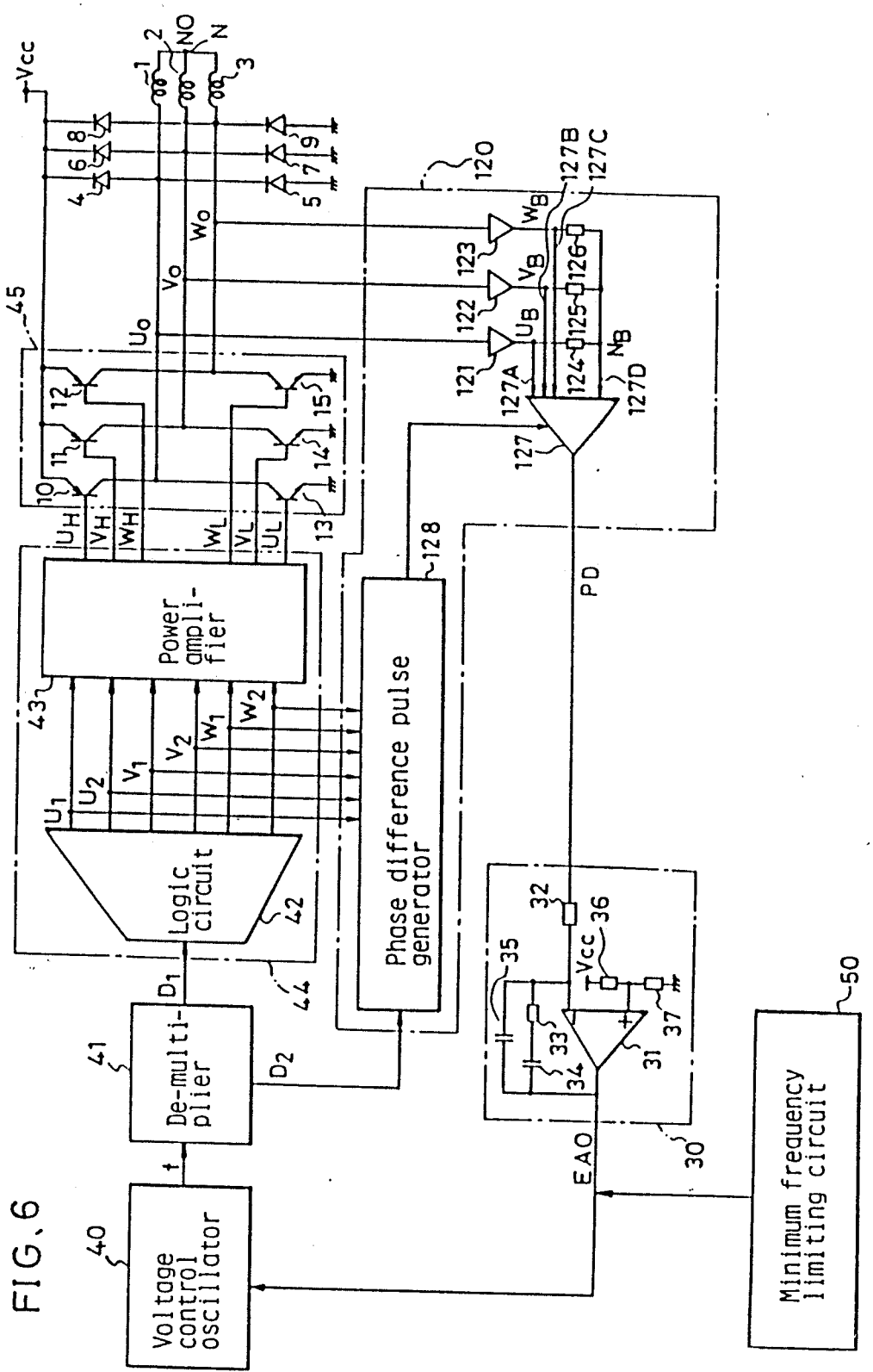
FIG. 6 is a circuitry of a second embodiment of the driving apparatus for the brushless motor in accordance with the present invention.
Figure 7:
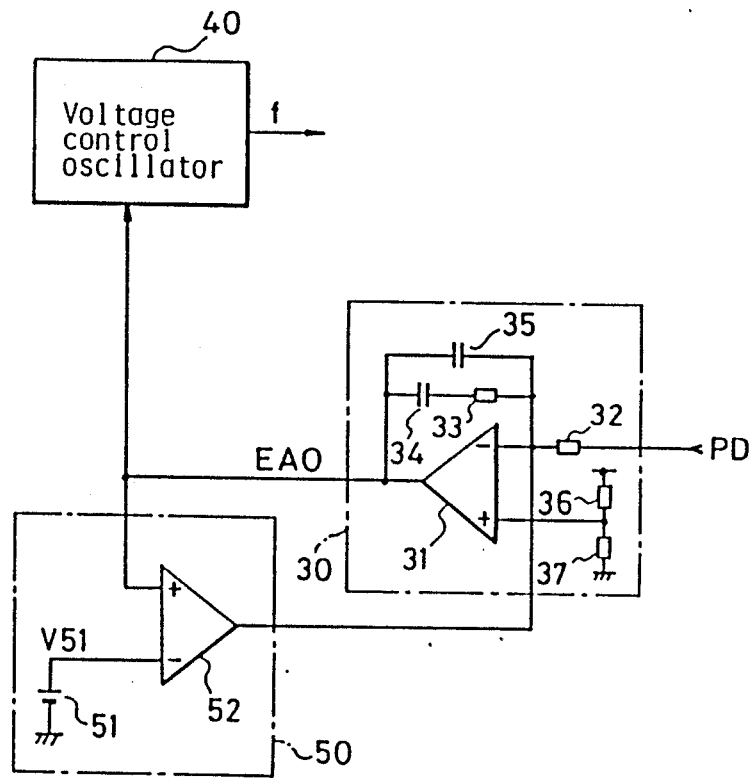
FIG. 7 is a circuitry of a lowest frequency limiting circuit.

FIG. 6 is a circuit of a second embodiment of the driving apparatus for the brushless motor in accordance with the present invention. In the second embodiment, a lowest frequency limiting circuit 50 is added to the circuitry as shown in FIG. 1. A circuitry of the lowest frequency limiting circuit 50 is shown in FIG. 7. Referring to FIG. 7, a reference voltage source 51 is applied to an invert input of a comparator 52 of the lowest frequency limiting circuit 50. The output voltage EAO of the amplifier 30 is applied to a noninvert terminal of the comparator 52. The output of the comparator 52 is inputted to the invert input of the operational amplifier 31 of the amplifier 30. The voltage of the reference voltage source 51 is to set a lowest frequency of the voltage control oscillator 40. The comparator 52 compares the output voltage EAO of the amplifier 30 with the reference voltage $V_{51}$ of the reference voltage source 51. The comparator 52 applies an output to the invert input of the operational amplifier 31 when the output voltage EAO is lower than the reference voltage $V_{51}$ of the reference voltage source 51, and further drop of the output voltage EAO is prevented. As a result, the frequency of the voltage control oscillator 40 is held above the lowest frequency corresponding to the voltage $V_{51}$ of the reference voltage source 51.

Operation of the driving apparatus having the lowest frequency limiting circuit 50 is elucidated hereafter.

Referring to FIG. 6, since the lowest frequency limiting circuit 50 maintains the frequency of the voltage control oscillator 40 to a value which is higher than a predetermined lowest frequency, switching operation of the current switching circuit 44 is always maintained. Therefore, revolution of the brushless motor is maintained. Moreover, when the power source of the driving apparatus is supplied, or even if the revolution of the rotor is stopped, a torque of the rotor is generated.

After start of revolution of the rotor, the counter-electromotive voltage is generated in the driving coils, and the phase control loop of the first embodiment is formed and the stable revolution of the brushless motor is maintained.

In the circuit as shown in FIG. 7, though the output EAO of the amplifier 30 is compared with the reference voltage $V_{51}$ of the reference voltage source 51, substantially the same function is effectuated by comparison of the reference voltage $V_{51}$ with a signal corresponding to the frequency, directly or indirectly.

Figure 8:
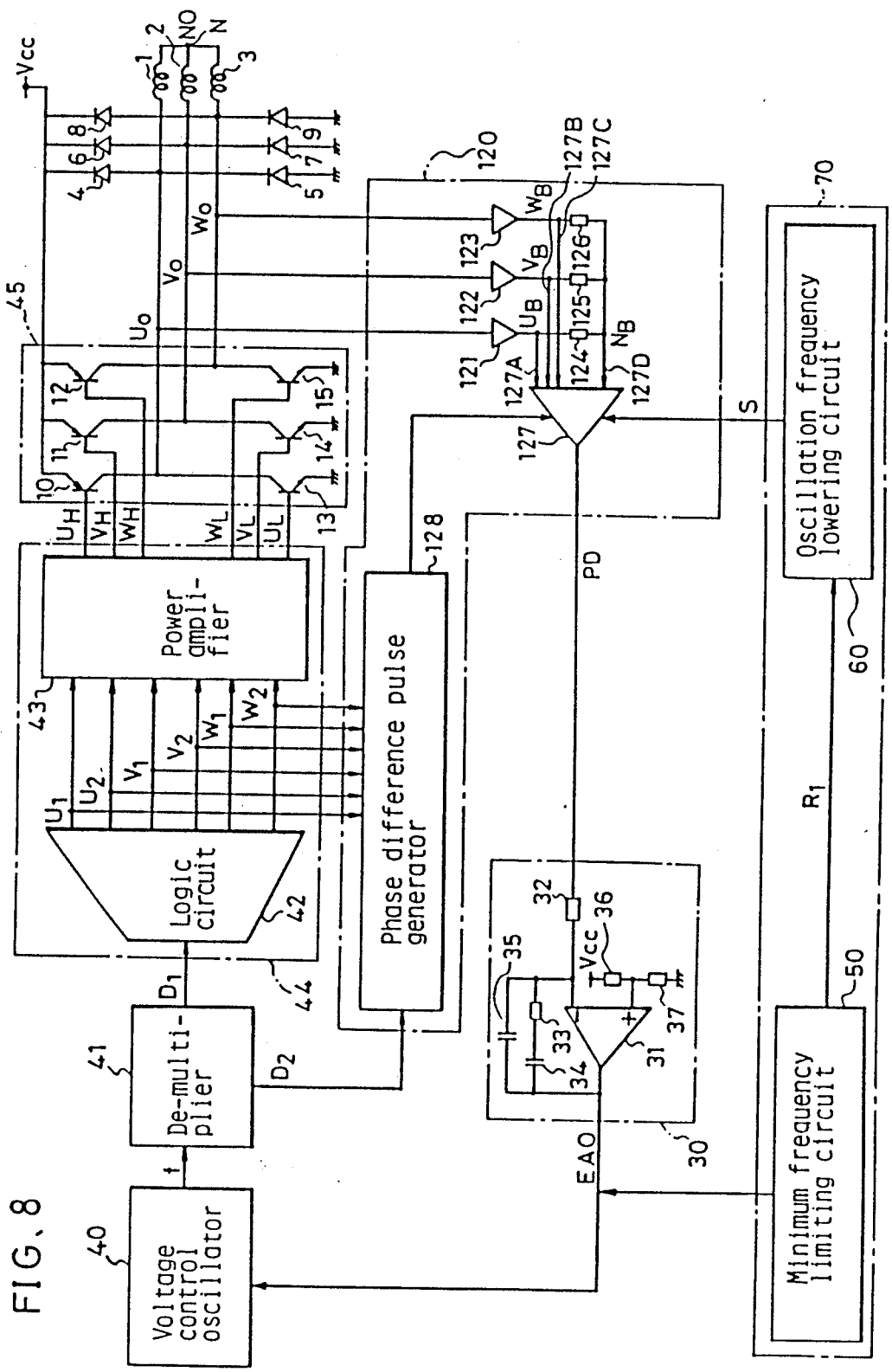
FIG. 8 is a circuitry of a third embodiment of the driving apparatus of the brushless motor in accordance with the present invention.

FIG. 8 is a circuitry of a third embodiment of the driving apparatus for the brushless motor in accordance with the present invention. In the third embodiment, oscillation frequency initializing means 70, which is composed of the lowest frequency limiting circuit 50 and a oscillation frequency lowering circuit 60, is added to the circuitry of the first embodiment as shown in FIG. 1.

The oscillation frequency lowering circuit 60 controls the output of the phase difference detector 120 on the basis of operation of the lowest frequency limiting circuit 50. In starting of the brushless motor, when the power source voltage Vcc is supplied to the driving apparatus, the output EAO of the amplifier 30 is irregular due to influence of electric charges which are charged in the capacitors 34 and 35, and the phase difference signal PD of the phase difference detector 120 is generally unstable. Consequently, an oscillation frequency f of the voltage control oscillator 40 is also unstable. For example, if the voltage control oscillator 40 oscillates a very high frequency, the driving coils 1, 2 and 3 are switched on the basis of the high frequency. Thus, the magnetic field of the driving coils 1, 2 and 3 revolve in high velocity. On the other hand, since the rotor has a predetermined inertia, revolution of the rotor can not follow the revolving magnetic field by the driving coils 1, 2 and 3, since the revolution number of the magnetic field becomes higher than that of the rotor which has a considerable inertia. As a result, a starting torque is not produced, and the brushless motor can not be started. The oscillation frequency initializing means 70 serves to resolve the above-mentioned problem.

Figure 10A:
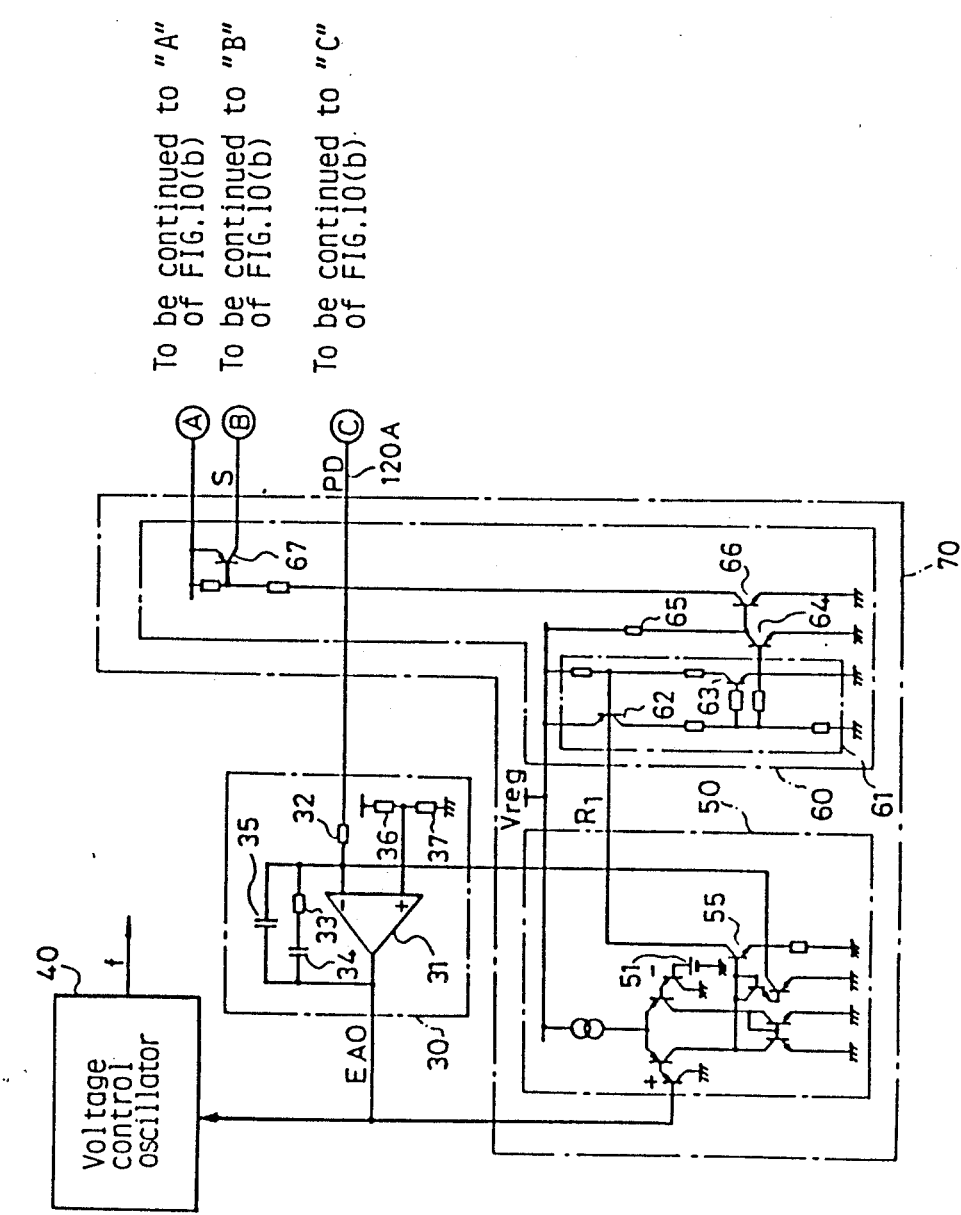
Figure 10B:
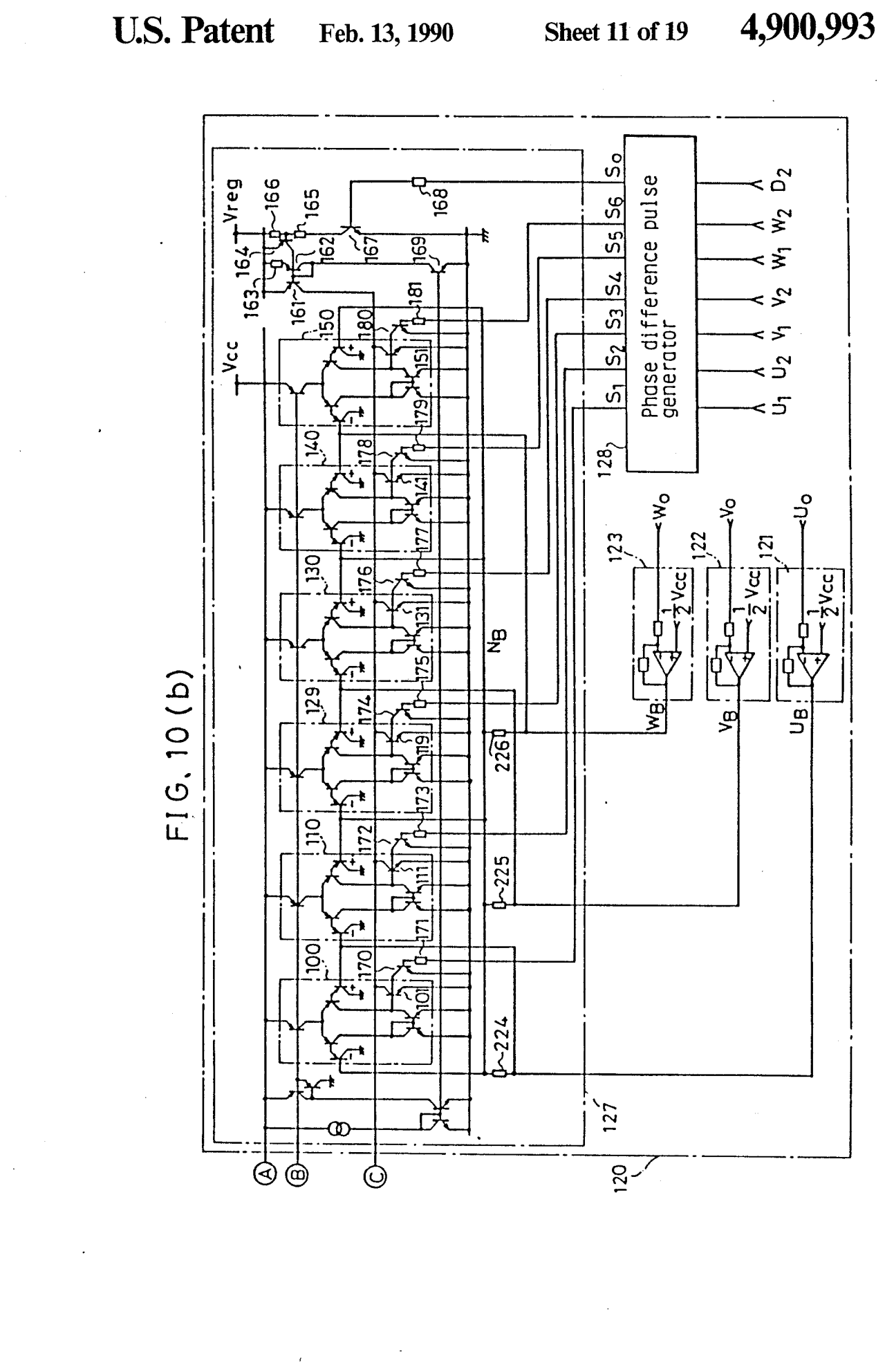

An example of a detailed circuit of the driving apparatus comprising the oscillation frequency initializing means 70 is shown in FIG. 10(a) and FIG. 10(b). Referring to FIG. 10(a), the oscillation frequency initializing means 70 is composed of the lowest frequency limiting circuit 50 and the oscillation frequency lowering circuit 60. The lowest frequency limiting circuit 50 is identical with the circuit as shown in FIG. 7.

The transistor 55 of the lowest frequency limiting circuit 50 turns ON when the voltage of output EAO of the amplifier 30 coincides with the voltage of the reference voltage source 51, and the frequency f of the voltage control oscillator 40 coincides with a lowest frequency $f_{low}$ corresponding to the voltage of the reference voltage source 51. However, the transistor 55 remains OFF when the frequency f is above the lowest frequency $f_{low}$. Immediately after supply of the power source, the frequency f is generally higher than the lowest frequency $f_{low}$, therefore the transistor 55 turns OFF. Then, the collector voltage level $R_1$ of the transistor 55 turns to high level. In the above-mentioned state, a transistor 62 remains OFF, and both transistors 63 and 64 remain OFF. Consequently, a transistor 66 remains ON because of the base current supplied through the resistor 65, and thereby the transistor 67 remains ON, and the output S remains at a high level. Thus, an electric power is not supplied to the comparators 100, 110, 129, 130, 140 and 150, and the respective transistors 101, 111, 119, 131, 141 and 151 turn OFF. As a result, a current does not flow into the output terminal 120A of the phase difference detector 120. On the other hand, outflow of the current from the output terminal 120A of the phase difference detector 120 is controlled by the transistor 161 under the low level of the output $S_O$ of the phase difference pulse generator 128. The output $S_O$ is generated by logical operation of the output of the voltage control oscillator 40 and becomes to a low level or to the high level in synchronism with the frequency f of the voltage control oscillator 40. Consequently, the phase difference signal PD turns to high level at every becoming to low levels of the output signal $S_O$, and thereby the output EAO of the amplifier 30 is lowered. Thus, the frequency f of the voltage control oscillator 40 is also lowered responding to the output EAO, and when the frequency f reaches the lowest frequency $f_{low}$, the transistor 55 turns ON. In this time, the output $R_1$ of the oscillation frequency lowering circuit 60 turns to low level.

Then, the transistor 62 turns ON, and the transistors 63 and 64 also turns ON. If the transistor 55 turns OFF after turns ON of the transistor 63, the transistor 62 remains ON by turn ON of the transistor 63. Namely, after the frequency f reaches the lowest frequency $f_{low}$, the transistors 62, 63 and 64 remain ON, and the transistors 66 and 67 remain OFF. Consequently, the electric power is supplied to the comparator 100, 110, 129, 130, 140 and 150, and the respective transistor 101, 111, 119, 131, 141 and 151 become operable, and the phase difference detector 120 allows inflow of the current. Transistors 62 and 63 form a memory circuit 61 for memorizing the above-mentioned operation hysteresis of the lowest frequency limiting circuit 50.

In the above-mentioned circuit, when the power source voltage Vcc is applied to the driving apparatus as shown in FIG. 9(a), the output S of the oscillation frequency lowering circuit 60 remains high level as shown in FIG. 9(d), and thereby the phase difference signal PD does not turn to low level, and increase of the output EAO is prevented. Therefore, when the phase difference signal PD turns high level, the output EAO lowers, and frequency f of the voltage control oscillator 40 is lowered as shown in FIG. 9(b). When the frequency f of the voltage control oscillator 40 is lowered to the lowest frequency $f_{low}$ of the lowest frequency limiting circuit 50, the output $R_1$ of the lowest frequency limiting circuit 50 turns to low level as shown in FIG. 9(c). The output $R_1$ is inputted to the oscillation frequency lowering circuit 60. Consequently the output S of the oscillation frequency lowering circuit 60 turns to low level as shown in FIG. 9(d). The current inflow function of the phase difference detector 120 is activated by the low level output S, and the frequency f of the voltage control oscillator 40 rises from the lowest frequency $f_{low}$. Accordingly, the revolution velocity of the revolving magnetic field of the driving coils gradually increases from a predetermined low revolution velocity which can be followed by the rotor, and the brushless motor is started.

According to the above-mentioned third embodiment, since the oscillating frequency of the voltage control oscillator 40 is initialized to a predetermined frequency, when the power source is supplied to the driving apparatus, the brushless motor can be started without failure.

In the example as shown in FIG. 8, current in-flow function of the phase difference detector 120 is stopped by turning to high level of the output S of the oscillation frequency lowering circuit 60, and the oscillation frequency of the voltage control oscillator 40 is lowered. The same effect is realized by turning to high level input of the inverse input terminal of the operational amplifier 31.

Figure 11:
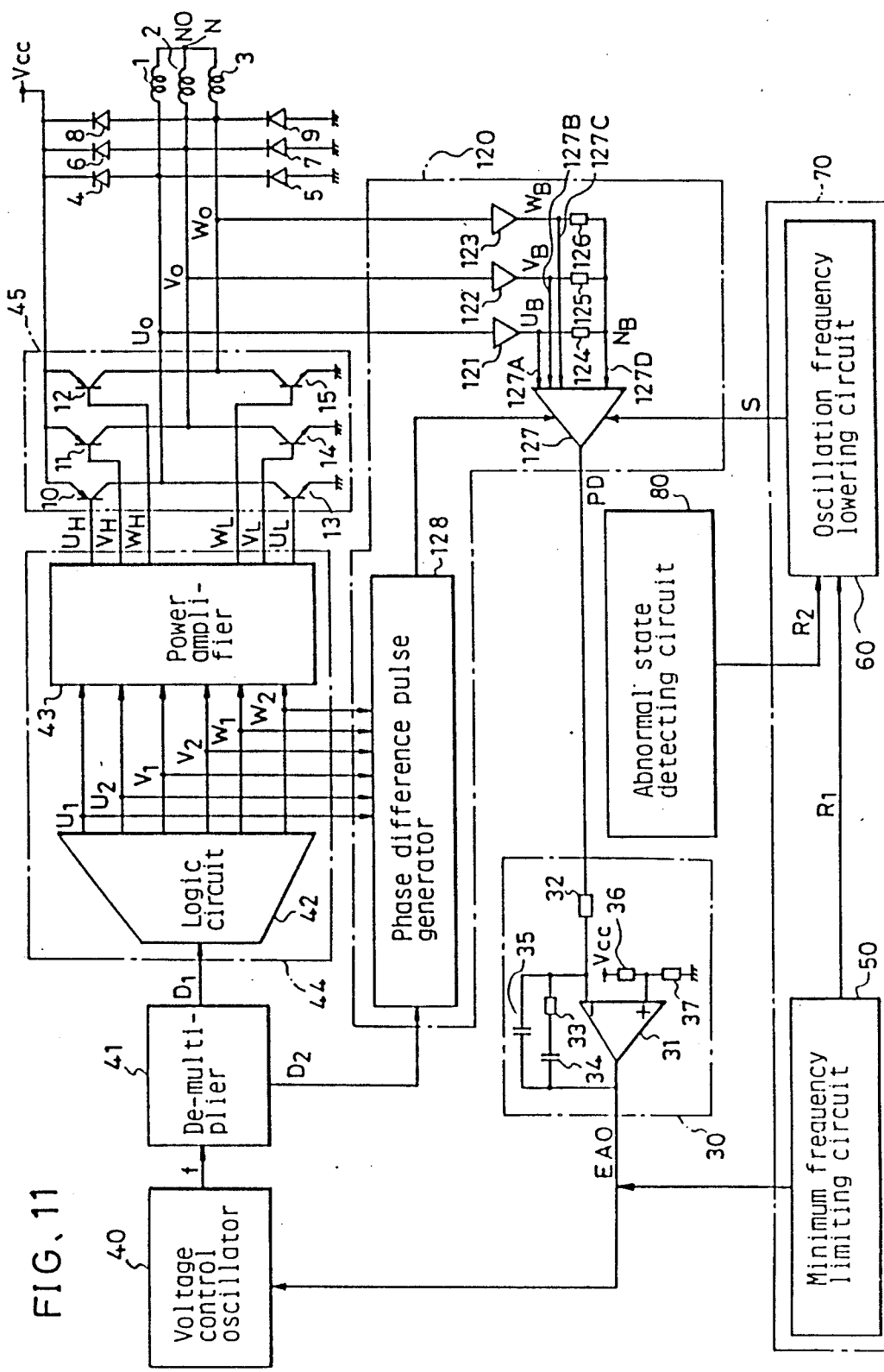
FIG. 11 is a circuitry of a fourth embodiment of the driving apparatus for the brushless motor in accordance with the present invention.

FIG. 11 is a circuitry of a fourth embodiment of the driving apparatus for the brushless motor in accordance with the present invention. In the fourth embodiment, an abnormal state detecting circuit 80 is added to the circuitry of the third embodiment as shown in FIG. 8.

When the rotating rotor is stopped by braking, for example, the counter-electromotive voltages of the driving coils 1, 2 and 3 disappear. In this time, if the frequency f of the voltage control oscillator 40 is higher than a predetermined value, the rotor cannot follow a revolving magnetic field produced by the driving coils 1, 2 and 3. As a result, a starting torque is not produced on the rotor, thus the brushless motor cannot restart revolution, even if the braking force is released. In the above-mentioned case, the abnormal state detecting circuit 80 detects a state of high frequency of the voltage control oscillator 40, and controls the oscillation frequency initializing means 70. Consequently, the Frequency of the voltage control oscillator 40 is initialized to a predetermined low frequency, and the brushless motor restarts.

Figure 12A:
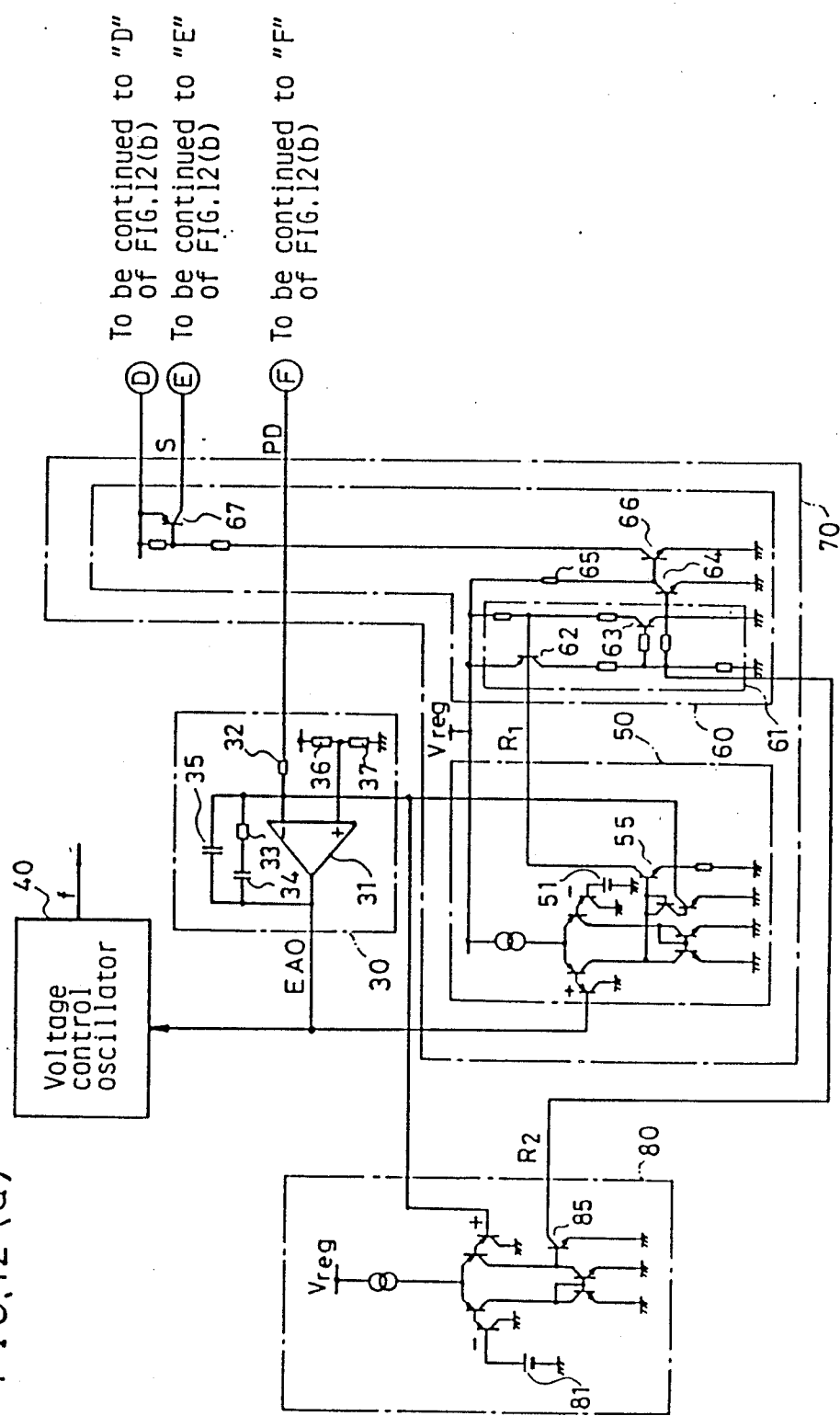
FIG. 12(a) and FIG. 12(b) are a detailed circuitry of the fourth embodiment of the driving apparatus for the brushless motor.
Figure 12:
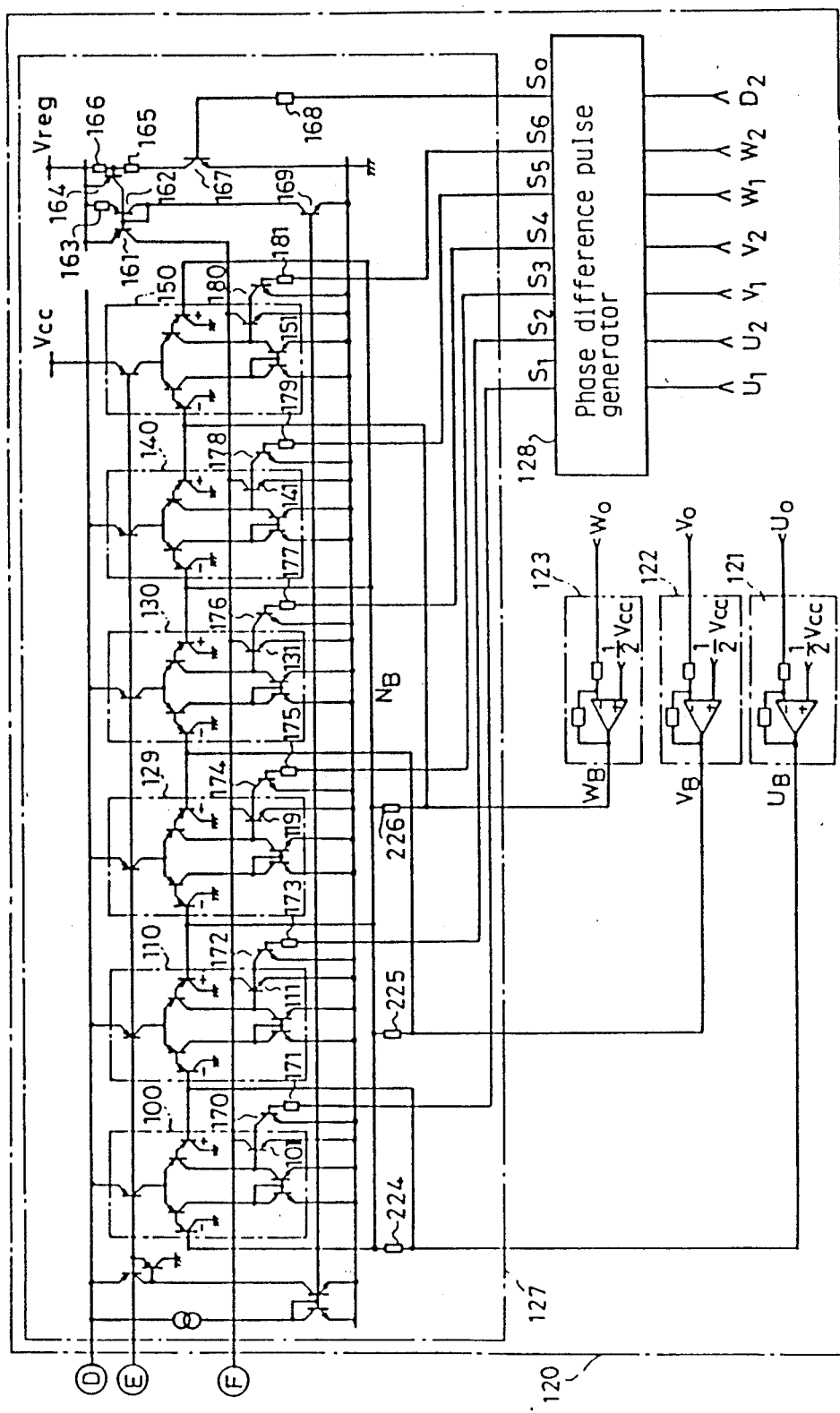

FIG. 12(a) and FIG. 12(b) are a detailed circuit of the driving apparatus comprising the abnormal state detecting circuit 80. Referring to FIG. 12(a), the abnormal state detecting circuit 80 comprises a comparator wherein a reference voltage source 81 is coupled to the invert input terminal, and the invert input of the operational amplifier 31 of the amplifier 30 is coupled to the noninvert input thereof. The output $R_2$ of the abnormal state detecting circuit 80 is inputted to the oscillation frequency lowering circuit 60. The remaining circuits as shown in FIG. 12(a) and FIG. 12(b) are identical with that of FIG. 10(a) and FIG. 10(b).

When the rotor is stopped, since the output EAO of the amplifier 30 rises or falls on the basis of the phase difference signal PD of the phase difference detector 120, and the frequency f of the voltage control oscillator 40 is varied. When the frequency f of the voltage control oscillator 40 is lowered, a revolution velocity of the revolving magnetic field decreases. When the revolution velocity reaches a value wherein the rotor can follow, the starting torque is produced and the brushless motor restarts revolution. On the other hand, in case that the frequency f of the voltage control oscillator 40 rises, the revolution velocity of the revolving magnetic field increases. Thus the rotor can not follow the revolving magnetic field, and the starting torque is not produced. In this state, the frequency f of the voltage control oscillator 40 rises to a saturation value of the output EAO.

In the abnormal state detecting circuit 80, the above-mentioned abnormal state is detected by detecting saturation of the output EAO. Referring to FIG. 12(a) and FIG. 12(b), a reference voltage of the reference voltage source 81 which is slightly lower than a noninvert input voltage of the operational amplifier 31 is applied to the invert input of the comparator of the abnormal state detecting circuit 80. The invert input voltage of the operational amplifier 31 is compared with the reference voltage of the reference voltage source 81. When the output EAO saturates, the invert input voltage of the operational amplifier 31 becomes lower than the reference voltage of the reference voltage source 81, and a transistor 85 of the abnormal state detecting circuit 80 turns ON (Output $R_2$ is in low level). Then the transistors 63 and 64 turn OFF, and the transistors 66 and 67 turn ON. Therefore, the output S of the oscillation frequency lowering circuit 60 turns to high level, and the output EAO falls. Thus the frequency f is lowered and is initialized. As a result, the brushless motor is enabled to be started.

FIG. 13(a)-FIG. 13(d) are waveform charts showing operation of the driving apparatus as shown in FIG. 12(a) and FIG. 12(b). Referring to FIG. 13(a), the rotor is stopped at time $t_0$, and a revolution velocity n becomes zero. Then, the output EAO rises to a maximum value as shown in FIG. 13(b), and the output $R_2$ turns to low level as shown in FIG. 13(d). Consequently, the output S turns to high level as shown in FIG. 13(e). The output EAO is lowered and finally reach the lowest frequency of the lowest frequency limiting circuit 50 at time $t_2$. Thus the frequency of the voltage control oscillator 40 is initialized.

In the abnormal state detecting circuit 80 as shown in FIG. 12(a) and FIG. 12(b), abnormal state is detected by saturation of the output EAO of the amplifier 30, wherein the abnormal state can be detected by rise of the output EAO to a predetermined upper limit of the output EAO.

In the above-mentioned embodiments, though the disclosure is elucidated with respect to the three-phase full-wave driving method, the present invention is applicable to a two-phase full-wave driving method, two-phase half-wave driving method or three-phase half-wave driving method.

What is claimed is:

1. A driving apparatus for a brushless motor having a plurality of driving coils for different phases, comprising:
   switching means for switching voltages to said driving coils of said brushless motor,
   a switching signal generation circuit for controlling said switching means and for generating a switching signal,
   a phase difference detector for detecting a phase difference between a counter-electromotive voltage induced by one of said switching voltages in one of said plurality of driving coils and said switching signal in a time period that said induced voltage equals said one switching voltage,
   an amplifier for amplifying a detected signal of said phase difference detector and outputting an amplified signal, and
   a voltage-controlled oscillator for oscillating a signal controlled in frequency by said amplified signal and for supplying said oscillated signal to said switching signal generation circuit.

2. A driving apparatus for a brushless motor in accordance with claim 1, wherein said phase difference detector comprises:
   a phase difference pulse generator, responsive to said oscillated signal, for generating a pulse signal in said time period, wherein said one switching voltage is not applied to said one driving coil during said time period, and
   comparison means for comparing said counter-electromotive voltage induced in the one driving coil with a reference voltage in synchronism with said pulse signal of said phase difference pulse generator.

3. A driving apparatus for a brushless motor in accordance with claim 1, wherein said phase difference detector comprises:
   a phase difference pulse generator, responsive to said oscillated signal, for generating a pulse signal in said time period, wherein said one switching voltage is not applied to said one driving coil during said time period,
   buffer circuits connected to respective terminals of said driving coils, and
   comparison means for comparing outputs of said buffer circuits with a reference voltage in synchronism with said pulse signal of said phase difference pulse generator.

4. A driving apparatus for a brushless motor in accordance with claim 2 or 3, wherein
   said comparison means comprises a plurality of comparators wherein output terminals thereof are coupled together, and operation of the respective comparators are controlled by a plurality of said pulse signals output by said phase difference pulse generator.

5. A driving apparatus for a brushless motor in accordance with claim 2 or 3, wherein
   said reference voltage is substantially a composite voltage of said respective driving coils.

6. A driving apparatus for a brushless motor having a plurality of driving coils for different phases, comprising:
   switching means for switching currents to said driving coils of said brushless motor,
   a switching signal generation circuit for controlling said switching means and for generating a switching signal,
   a phase difference detector for detecting a phase difference between a counter-electromotive voltage induced by one of said switching currents in one of said respective driving coils and said switching signal in a time period that said induced voltage corresponds to said one switching current, an amplifier for amplifying a detected signal by said phase difference detector and outputting an amplified signal, and a voltage control oscillator for oscillating a signal controlled in frequency by said amplified signal and for supplying said oscillated signal to said switching signal generation circuit, and a lowest frequency limiting circuit for limiting a lowest frequency of said voltage control oscillator.

7. A driving apparatus for a brushless motor in accordance with claim 6, wherein said lowest frequency limiting circuit comprises a lowest frequency setting means for outputting a reference voltage and a comparator for detecting a difference between said amplified signal and said reference voltage, said amplifier being controlled by an output of said comparator and thereby limiting said oscillating frequency of said voltage control oscillator to be no less than said lowest frequency.

8. A driving apparatus for a brushless motor having a plurality of driving coils for different phases, comprising:

switching means for switching currents to said driving coils of said brushless motor, a switching signal generation circuit for controlling said switching means and for generating a switching signal, a phase difference detector for detecting a phase difference between a counter-electromotive voltage induced by one of said switching currents in one of said respective driving coils and said switching signal in a time period that said induced voltage corresponds to said one switching current, an amplifier for amplifying a detected signal by said phase difference detector and outputting an amplified signal, and a voltage control oscillator for oscillating a signal controlled in frequency by said amplified signal and for supplying said oscillated signal to said switching signal generation circuit, and an oscillation frequency initializing means for initializing an oscillation frequency of said voltage control oscillator into a predetermined value.

9. A driving apparatus for a brushless motor in accordance with claim 8, wherein said oscillation frequency initializing means comprises:

a lowest frequency limiting circuit for limiting a lowest frequency of said voltage control oscillator to a predetermined value; and an oscillation frequency lowering circuit for lowering said oscillation frequency of said voltage control oscillator to said lowest frequency of said voltage control oscillator.

10. A driving apparatus for a brushless motor in accordance with claim 9, wherein said oscillation frequency lowering circuit comprises a memory circuit for storing an operation of said lowest frequency limiting circuit, said phase difference detector being controlled by said memory circuit.

11. A driving apparatus for a brushless motor having a plurality of driving coils for different phases, comprising:

switching means for switching currents to said driving coils of said brushless motor, a switching signal generation circuit for controlling said switching means and for generating a switching signal, a phase difference detector for detecting a phase difference between a counter-electromotive voltage induced by one of said switching currents in one of said respective driving coils and said switching signal in a time period that said induced voltage corresponds to said one switching current, an amplifier for amplifying a detected signal by said phase difference detector and outputting an amplified signal, and a voltage control oscillator for oscillating a signal controlled in frequency by said amplified signal and for supplying said oscillated signal to said switching signal generation circuit, an oscillation frequency initializing means for initializing an oscillation frequency of said voltage control oscillator into a predetermined value, and an abnormal state detecting circuit for detecting an abnormal state of frequency of said voltage control oscillator and for controlling said oscillation frequency initializing means during said abnormal state.

12. A driving apparatus for a brushless motor in accordance with claim 11, wherein:

said amplifier includes an operational amplifier having a first invert input responsive to said detected signal; and said abnormal state detecting circuit comprises a comparator having a second input and a second invert input, the first invert input of the amplifier being applied to the second input of the comparator and being compared with a reference voltage applied to the second invert input of said comparator.

* * * * *